United States Patent
Okumura et al.

(10) Patent No.: US 11,980,818 B2
(45) Date of Patent: May 14, 2024

(54) GAME SYSTEM, PROCESSING METHOD, AND INFORMATION STORAGE MEDIUM

(71) Applicants: BANDAI NAMCO Entertainment Inc., Tokyo (JP); BANDAI NAMCO Online Inc., Tokyo (JP); BANDAI NAMCO Studios Inc., Tokyo (JP)

(72) Inventors: Daigo Okumura, Tokyo (JP); Minoru Sashida, Tokyo (JP); Hiroaki Kado, Tokyo (JP); Yukie Kanno, Tokyo (JP); Chika Ishii, Tokyo (JP); Takayoshi Oi, Tokyo (JP)

(73) Assignees: BANDAI NAMCO ENTERTAINMENT INC., Tokyo (JP); BANDAI NAMCO ONLINE INC., Tokyo (JP); BANDAI NAMCO STUDIOS INC., Tokyo (JP)

( * ) Notice: Subject to any disclaimer, the term of this patent is extended or adjusted under 35 U.S.C. 154(b) by 17 days.

(21) Appl. No.: 17/567,523

(22) Filed: Jan. 3, 2022

(65) Prior Publication Data

US 2022/0118361 A1    Apr. 21, 2022

Related U.S. Application Data

(63) Continuation of application No. PCT/JP2020/025649, filed on Jun. 30, 2020.

(30) Foreign Application Priority Data

Jul. 4, 2019   (JP) ................. 2019-125405

(51) Int. Cl.
*A63F 13/63*   (2014.01)
*A63F 13/525*  (2014.01)
*A63F 13/537*  (2014.01)

(52) U.S. Cl.
CPC ............ *A63F 13/63* (2014.09); *A63F 13/525* (2014.09); *A63F 13/537* (2014.09)

(58) Field of Classification Search
CPC ...... A63F 13/63; A63F 13/525; A63F 13/537; A63F 13/822; A63F 2300/5553
See application file for complete search history.

(56) References Cited

U.S. PATENT DOCUMENTS 10,452,896 B1 * 10/2019 Weise ................. G06T 13/40
2008/0309677 A1 * 12/2008 Fleury ................. G06T 19/00
                                                          345/619

(Continued)

FOREIGN PATENT DOCUMENTS

JP     2006-230586 A    9/2006
JP     2018-108150 A    7/2018

OTHER PUBLICATIONS

Aug. 25, 2020 International Search Report issued in International Patent Application No. PCT/JP2020/025649.

*Primary Examiner* — Steve Rowland
(74) *Attorney, Agent, or Firm* — Oliff PLC

(57) ABSTRACT

A game system includes a processor, the processor being configured to perform a reception process of receiving an operation input by a player; a virtual space setting process of setting a virtual space in which at least one character is disposed; a virtual camera setting process of setting a plurality of virtual cameras; a character process of setting parts constituting the at least one character based on the operation input; and a display process of generating a plurality of character images, which are images of the at least one character viewed from the plurality of virtual cameras, and displaying a character-creation image in which the plurality of character images are arranged on a display section. In the display process, when the setting process of setting the parts is performed, the processor performs a (Continued)

process of displaying the character-creation image on which the result of the setting process is reflected.

16 Claims, 16 Drawing Sheets

(56) References Cited

U.S. PATENT DOCUMENTS

| | | | |
|---|---|---|---|
| 2009/0079743 A1* | 3/2009 | Pearson | G06T 13/20 345/473 |
| 2011/0248992 A1 | 10/2011 | van Os et al. | |
| 2017/0312634 A1* | 11/2017 | Ledoux | A63F 13/655 |
| 2019/0339847 A1* | 11/2019 | Scapel | A63F 13/58 |

* cited by examiner

GAME SYSTEM, PROCESSING METHOD, AND INFORMATION STORAGE MEDIUM

CROSS REFERENCE TO RELATED APPLICATION

This application is a continuation of International Patent Application No. PCT/JP2020/025649, having an international filing date of Jun. 30, 2020, which designated the United States, the entirety of which is incorporated herein by reference. Japanese Patent Application No. 2019-125405 filed on Jul. 4, 2019 is also incorporated herein by reference in its entirety.

BACKGROUND

Game systems in which players can create characters and make the created characters appear in the game have been previously known. For example, the technique disclosed in Japanese Unexamined Patent Application Publication No. 2006-230586 has been known as such a game system. Character creation is also referred to as character making, and players can create original characters by attaching their desired parts such as body parts, costume parts, or equipment parts to the character.

In character creation, players desire to create original characters that do not look like characters created by other players. For this reason, it is desirable for players to be able to choose the details of parts of a character. However, there is a problem that setting of parts of a character requires detailed operation, thereby decreasing the operation efficiency of the players.

DESCRIPTION OF EXEMPLARY EMBODIMENTS

Figure 1A:
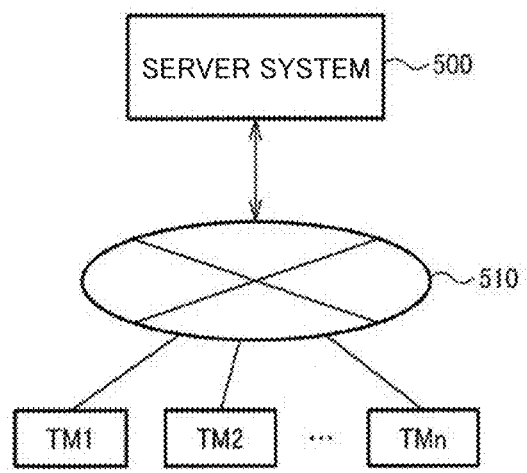
FIGS. 1A to 1F are explanatory views of a hardware device for implementing a game system of the present embodiment.
Figure 1B:
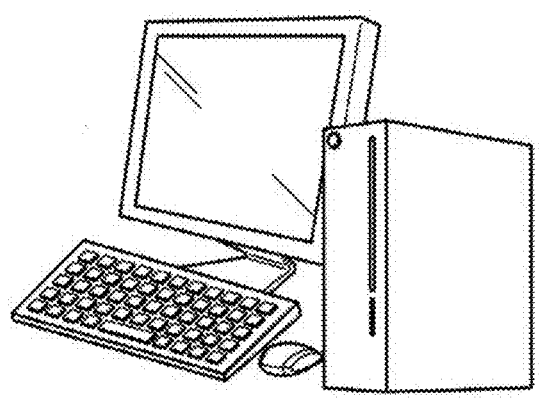
Figure 1C:
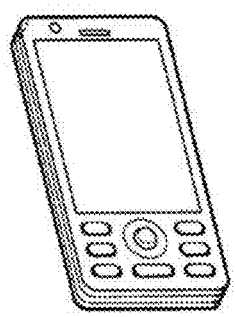
Figure 1D:
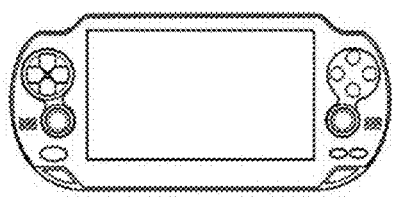
Figure 1E:
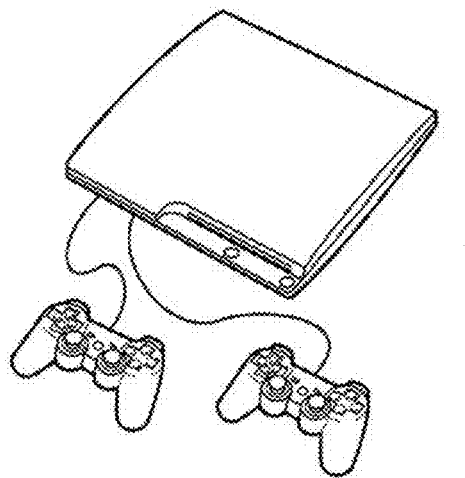

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements 1. Game System First, a hardware device for implementing a game system according to the present embodiment is described below with reference to FIGS. 1A to 1E.

In FIG. 1A, a server system 500 (information processing system) is communicably connected to terminal devices TM1 to TMn via a network 510. For example, the server system 500 is a host computer, and the terminal devices TM1 to TMn are of clients. The game system according to the present embodiment and processing thereof may be implemented by the server system 500, or by the terminal devices TM1 to TMn. The game system may also be implemented by a distributed process by the server system 500 and the terminal devices TM1 to TMn.

The game system and the processing of the present embodiment can also be implemented by a method for blockchain. For example, each process of the game system of the present embodiment may be executed using a program called a smart contract that can be executed by Ethereum. In this case, the terminal devices TM1 to TMn are connected by means of peer-to-peer. Various types of information such as game information exchanged between the terminal devices TM1 to TMn are transferred using blockchain. Hereinafter, each of the terminal devices TM1 to TMn is described as a terminal device TM as necessary.

The server system 500 can be implemented by, for example, one or a plurality of servers (a management server, a game server, a charging server, a service providing server, a content distribution server, an authentication server, a database server, a communication server, and the like). The server system 500 provides various services for operating a community website, an online game, or the like, and is capable of managing data necessary for performing the game and distributing a client program, various types of data, and the like. This enables, for example, the terminal device TM serving as a user terminal to access the server system 500 to use a social networking service (SNS) or the like, thereby enabling it to play a network game such as an online game, a social game, or a consumer game provided by the server system 500.

The network 510 (distribution network, communication line) is a communication channel using, for example, the Internet, a wireless LAN, or the like. The network 510 may include a communication network such as a telecommunication network, a cable network, or a wireless LAN, in addition to an exclusive line (exclusive cable) for direct connection or a LAN by means of Ethernet (registered trademark) or the like. The communication method may be wired or wireless.

Figure 1F:
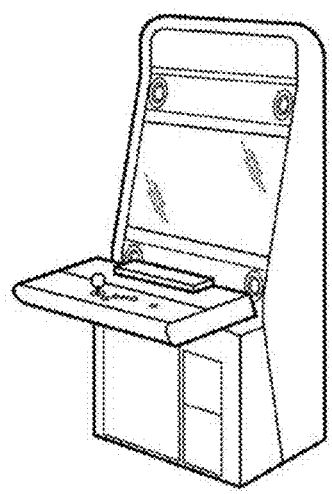

The terminal device TM (player terminal) is, for example, a terminal having a net connection function (Internet connection function). Examples of the terminal device TM include various devices such as an information processing device, such as a personal computer or a tablet computer shown in FIG. 1B, a portable communication terminal such as a smartphone or a mobile phone shown in FIG. 1C, a portable game device shown in FIG. 1D, a consumer game device (stationary type) shown in FIG. 1E, an arcade game device shown in FIG. 1F, or the like. Alternatively, a wearable device (an HMD, a watch-type device, or the like) worn on a part such as a head or an arm of the player may be used as the terminal device TM.

Figure 2:
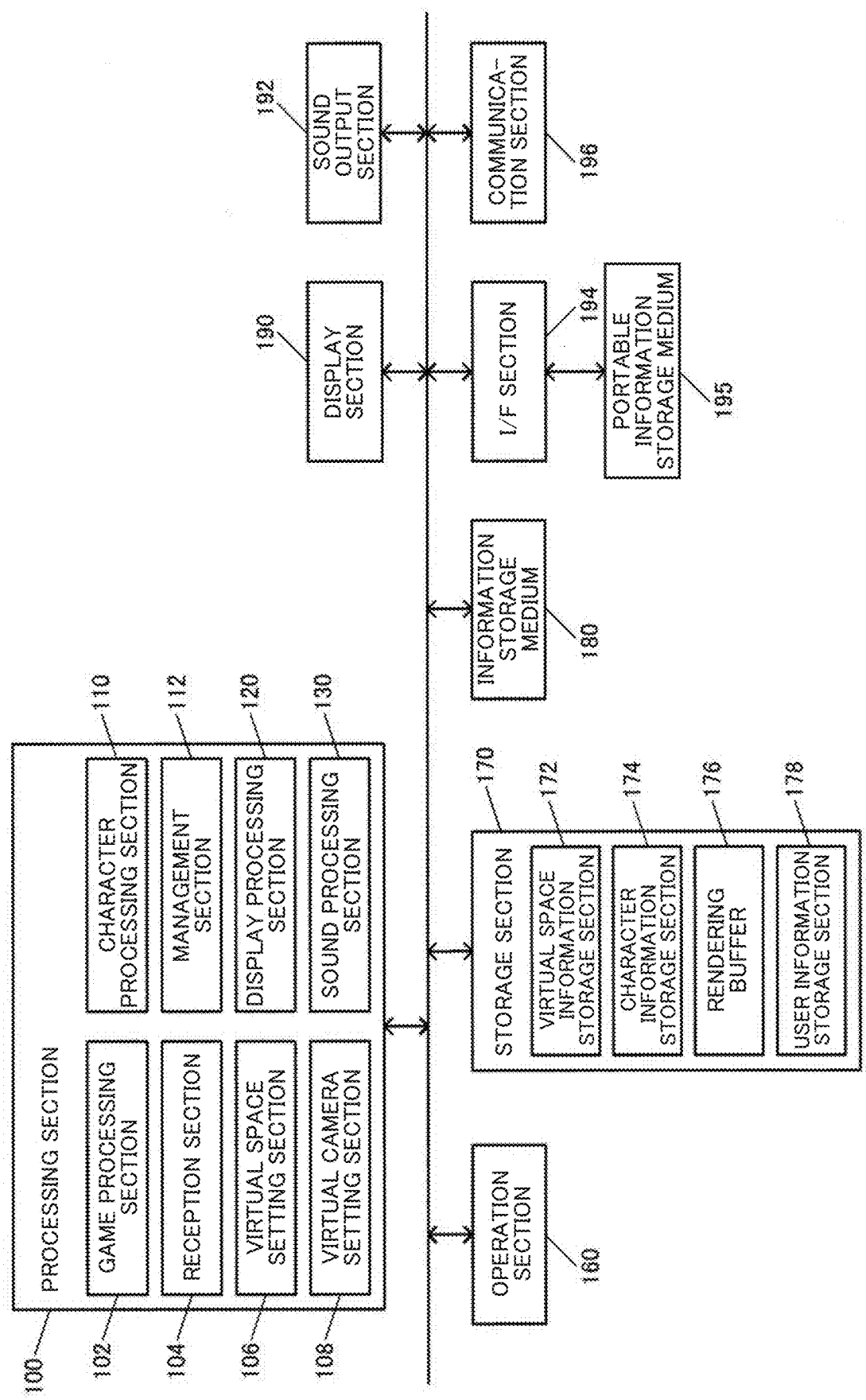
FIG. 2 is a configuration example of the game system of the present embodiment.

FIG. 2 shows a configuration example of the game system (character-creation system) according to the present embodiment. The game system according to the present embodiment is not limited to the structure shown in FIG. 2, and can be modified in various ways including omitting some of its components (sections) or adding another component. The game implemented by the game system according to the present embodiment may be a multiplayer game or a single-player game. The genre of the game is also not particularly limited, and the game may be applied to various games, such as an RPG (role playing game), an action game, a fighting game, a shooting game, a race game, a rhythm game (music game), a puzzle game, or the like. In the case of a competition game, the competition may be a one-to-one competition or a many-to-many competition. The competition may also be a one-to-many (one versus a plurality of enemies) competition or a many-to-one (a plurality of allies versus a plurality of enemies) competition. The opponent may be another player or an NPC (Non Player Character). The game may also be performed by, for example, forming a party of a plurality of cooperating players to complete with an NPC enemy. In addition, the game may be arranged such that the player does not operate the character by himself/herself; instead, AI (Artificial Intelligence) operates the character of the player. In this case, all or some of the characters of the player may be operated by AI.

The game system includes a processing section 100, an operation section 160, a storage section 170, a display section 190, a sound output section 192, an I/F section 194, and a communication section 196.

The processing section 100 (processor) performs a game process, a reception process, a virtual space setting process, a virtual camera setting process, a character process, a management process, a display process, a sound process, or the like based on various types of information, programs, operation information, and the like stored in the storage section 170 (database).

The processes (functions) according to the present embodiment performed by sections of the processing section 100 can be implemented by a processor (a processor including hardware). For example, the processes according to the present embodiment can be implemented by a processor that operates based on information such as a program and a memory that stores the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an IC) or one or a plurality of circuit elements (such as a resistor or a capacitor) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a SRAM or DRAM, or may be a register. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes a game processing section 102, a reception section 104, a virtual space setting section 106, a virtual camera setting section 108, a character processing section 110, a management section 112, a display processing section 120, and a sound processing section 130.

The game processing section 102 performs various game processes for allowing the player to play the game. Examples of the game processes include a process of starting the game when a game start condition is satisfied, a process of making the started game progress, a process of ending the game when a game end condition is satisfied, and a process of calculating a game score. For example, for a network game, the game processing section 102 manages user information for each player, thereby controlling the progress of the game for each player. The user information of the player is stored in a user information storage section 178.

The reception section 104 performs a process of receiving operation information that is input using the operation section 160. More specifically, the reception section 104 performs an interface process for receiving an operation input.

The virtual space setting section 106 performs a process of setting a virtual space (object space) in which objects are arranged. For example, the virtual space setting section 106 performs a process of setting disposition of various objects (an object formed by a primitive surface such as a polygon, a free-form surface or a subdivision surface) representing various display objects such as a moving body (a car, people, a robot, a train, an airplane, a ship, a monster, an animal, and the like), a map (terrain), a building, audience seats, a course (road), an item, a tree, a wall, or a water surface in the virtual space. Specifically, a position and a rotational angle (that is the same as an orientation or a direction) of an object in a world coordinate system are determined, and the object is disposed at the position (X, Y, Z) at the rotational angle (rotational angles about X, Y, and Z axes). More specifically, a virtual space information storage section 172 of the storage section 170 stores object information in association with an object number. The object information includes information about a position, a rotational angle, a movement speed, a moving direction, or the like of an object (part object) in the virtual space. That is, the object information is stored in the virtual space information storage section 172 as virtual space information. The virtual space setting section 106 performs a process of updating the object information, i.e., virtual space information, for example, for each frame.

The virtual camera setting section 108 performs a process of setting a virtual camera. For example, the virtual camera setting section 108 performs a process of setting the position, the direction, and the like of a virtual camera in a virtual space. For example, during the game, the virtual camera setting section 108 performs a process of controlling a virtual camera set as a first-person point-of-view or a third-person point-of-view of the player. For example, the virtual camera setting section 108 sets a virtual camera at a point-of-view of a character (player character) in the virtual space corresponding to the player in the real space, or at a point-of-view following the character to set a point-of-view position and a line-of-sight direction of the virtual camera, thereby controlling the position (position coordinates) and/or the orientation (a rotational angle about a rotation axis) of the virtual camera.

The character processing section 110 performs various types of processes regarding the character. For example, the character processing section 110 performs a process of setting parts to be attached to the character.

The management section 112 performs, for example, a player authentication process. For example, the management section 112 performs an authentication process of a player who has logged into the system using a terminal device. The authentication process is performed based on, for example, a password input by the player, account information, or the like. The management section 112 performs various charging processes, such as a process of determining a charge, a process of creating charging data, and a process of saving charging data. The management section 112 also performs various management processes, such as a process of managing various services or a process of managing various types of information.

For example, a player acquires an account by performing predetermined procedures so as to use a service provided by the server system 500 shown in FIG. 1A or the like. By inputting a password associated with the acquired account and logging in, the player can use various services such as play in network games, services at game websites, online shopping for items or the like, message exchange between players, and addition of friend player. The management section 112 also performs a process of managing the account information of the player.

The display processing section 120 performs a process of displaying an image on the display section 190. For example, the display processing section 120 performs a rendering process based on results of various processes (the game process, the virtual space setting process, the virtual camera setting process) performed by the processing section 100 to generate an image, and the image is displayed on the display section 190. Specifically, a geometry process such as coordinate transformation (world coordinate transformation, camera coordinate transformation), a clipping process, a perspective transformation, or a light source process is performed, and rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in a rendering buffer 176 (a buffer such as a frame buffer, or a work buffer that can store image information in a unit of pixels), based on the rendering data (primitive surface data). Thus, an image viewed from a virtual camera in the virtual space is generated. The rendering process performed by the display processing section 120 can be implemented by a vertex shader process, a pixel shader process, or the like.

The sound processing section 130 performs a process of outputting sound from the sound output section 192. For example, the sound processing section 130 generates sound generation data for generating the sound (voice, game sound, sound effect).

The operation section 160 allows the player (user) to input various kinds of information such as operation information, and the function thereof can be realized by an operation button, a direction designating key, an analog stick, a lever, various sensors (an angular speed sensor, an acceleration sensor, or the like), a microphone, a touch panel display, or the like. When a touch panel display is used, a touch panel serving as the operation section 160 and the display section 190 serving as a display are integrally provided.

The storage section 170 serves as a work area for the processing section 100, the communication section 196, and the like, and its function can be implemented by a semiconductor memory, HDD, SSD, an optical disc device, or the like. The storage section 170 includes the virtual space information storage section 172, a character information storage section 174, the rendering buffer 176, and the user information storage section 178. The virtual space information storage section 172 stores information regarding the virtual space, which is a three-dimensional object space. The virtual space information storage section 172 stores, for example, information regarding objects arranged in the virtual space. The character information storage section 174 stores information regarding characters. For example, the character information storage section 174 stores shape data (model information) and motion data of the character. The rendering buffer 176 is, for example, a frame buffer or a work buffer that is capable of storing image information in a unit of pixels. The user information storage section 178 stores, as user information, personal information (name, gender, date of birth, e-mail address, etc.) of the player who is the user. For example, the account information (user ID) of the player is also stored as user information. For example, charge information to be processed in the charging process is associated with account information (user ID) of each player.

An information storage medium 180 (computer-readable medium) stores a program, data, and the like. The function of the information storage medium 180 can be implemented by an optical disc, HDD, a semiconductor memory, and the like. The processing section 100 performs various processes of the present embodiment based on programs (data) stored in the information storage medium 180. The information storage medium 180 is capable of storing a program for causing a computer (a device including an operation section, a processing section, a storage section, and an output section) to function as the sections (i.e., a program for causing a computer to execute the processes of the sections) according to the present embodiment.

The display section 190 outputs an image generated according to the present embodiment, and the function thereof can be implemented by a LCD, an organic electroluminescence display, CRT, HMD, or the like. The sound output section 192 outputs sound generated according to the present embodiment, and the function thereof can be implemented by a speaker, a headphone, or the like.

The interface (I/F) section 194 performs an interface process for a portable information storage medium 195. The function of the I/F section 194 can be implemented by an application specific integrated circuit (ASIC) or the like for the I/F process. The portable information storage medium 195 is a storage device that stores various types of information from the player, and holds the information without power supply. The portable information storage medium 195 can be implemented by an integrated circuit (IC) card (memory card), a universal serial bus (USB) memory, a magnetic card, or the like.

The communication section 196 (communication interface) communicates with external apparatuses. The function of the communication section 196 can be implemented by a communication ASIC, hardware such as a communication processor, or a communication firmware.

The program (data) for causing the computer to function as the sections according to the present embodiment may be distributed to the information storage medium 180 (or the storage section 170) from an information storage medium of a server system (host device) through a network and the communication section 196. The scope of the present embodiment can include such a configuration where the information storage medium of the server system is used.

As shown in FIG. 2, the game system according to the present embodiment includes the reception section 104, the virtual space setting section 106, the virtual camera setting section 108, the character processing section 110, and the display processing section 120.

The reception section 104 receives an operation input by the player. For example, when the player performs various operation inputs using the operation section 160, the reception section 104 performs a process of receiving the operation input. That is, the reception section 104 performs a process of receiving operation information that has been input using the operation section 160.

The virtual space setting section 106 performs a process of setting a virtual space (object space). For example, the virtual space setting section 106 performs a process of setting a virtual space in which at least one character is disposed. The character is, for example, a three-dimensional object constituted of a plurality of primitives (polygons), and is, for example, a player character corresponding to a player.

The virtual camera setting section 108 performs a process of setting a plurality of virtual cameras. For example, the virtual camera setting section 108 sets a plurality of virtual cameras in a virtual space. For example, the virtual camera setting section 108 sets the plurality of virtual cameras to be oriented to at least one character disposed in the virtual space. For example, when the at least one character disposed in the virtual space is a plurality of characters, the virtual camera setting section 108 sets each virtual camera of the plurality of virtual cameras for each character of the plurality of characters. For example, the virtual camera setting section 108 sets each virtual camera to be oriented to each character. When only one character is disposed in the virtual space, each virtual camera of the plurality of virtual cameras arranged in various positions is disposed to be oriented to the character.

The character processing section 110 performs a process of setting the parts of the character(s). For example, the character processing section 110 performs a process of setting the parts constituting at least one of character based on an operation input by the player. For example, the character processing section 110 performs a process of setting the parts constituting the character by selecting and determining parts to be attached to the character based on an operation input by the player. The examples of the parts include body parts (face, chest, hip, arms, legs, and the like) of the character, costume parts, equipment parts such as weapons, protections, or the like. The parts setting process includes a process of replacing a part with another part, a process of changing the setting contents (type and shape) of a part, a process of changing motion data of a part (setting process), and the like. The embodiment described herein may be modified so that the operation input is made as an automatic operation input via a computer.

The display processing section 120 performs a process of displaying, on the display section 190, a character-creation image in which a plurality of character images are arranged. For example, the display processing section 120 generates a plurality of character images, each of which is an image of at least one character viewed from a plurality of virtual cameras in a virtual space. For example, when a plurality of characters are arranged in the virtual space, each character image of the plurality of character images is an image of one of the plurality of characters viewed from each virtual camera of the plurality of virtual cameras. In this case, for example, the directions of the plurality of characters are set so that their directions (relative directions) with respect to the direction of each virtual camera vary. The direction of the virtual camera is a line-of-sight direction of the virtual camera, and the direction of the character is a direction to which the character is oriented. In the case where only one character is disposed in the virtual space, each character image of the plurality of character images is an image of the one character viewed from each of the plurality of virtual cameras. In this case, for example, the plurality of virtual cameras are set so that their positions (relative positions) and the directions (relative directions) with respect to one character vary. The display processing section 120 generates a character-creation image in which the plurality of character images thus generated are arranged, and performs a process of displaying the character-creation image on the display section 190. The character-creation image is an image viewed by the player in the character creation, and is displayed to the player as a character-creation screen.

Then, when the parts setting process is performed, the display processing section 120 performs a process of displaying, on the display section 190, the character-creation image on which the results of the setting process are reflected. For example, when the parts setting process is performed with respect to the characters based on an operation input by the player, a character-creation image in which the results of the parts setting process are reflected on at least one character image is displayed. More specifically, a character-creation image in which the results of the parts setting process are reflected in all of the plurality of character images is displayed. The character image in which the results of the parts setting process are reflected is, for example, a character image in which a part(s) of the character is replaced, the setting contents of the part(s) are changed, or the motion data set for the part(s) is changed.

Further, the virtual space setting section 106 arranges, as at least one character, a plurality of characters in the virtual space. For example, in a case where first to N-th (N is an integer of 2 or more) character images are generated, the first to N-th characters are arranged at different positions in the virtual space. Then, the virtual camera setting section 108 sets each of the plurality of virtual cameras for each character of the plurality of characters. For example, the i-th (i is an integer satisfying $1 \leq i \leq N$) virtual camera of the first to N-th virtual cameras is set for the i-th character of the first to N-th characters. For example, each virtual camera (i-th virtual camera) of the plurality of virtual cameras is disposed so that it is oriented toward each character (i-th character). In this case, the i-th and j-th (j is an integer different from i and satisfies 1≤j≤N) characters and the i-th and j-th virtual cameras are arranged such that an angle formed by the direction of the i-th virtual camera and the direction of the i-th character is different from an angle formed by the direction of the j-th virtual camera and the direction of the j-th character. Then, the display processing section 120 generates, as each character image of the plurality of character images, an image of each of the plurality of characters viewed from each of the plurality of virtual cameras. For example, an image of the i-th character viewed from the i-th virtual camera is generated as an i-th character image of the plurality of character images, and an image of the j-th character viewed from the j-th virtual camera is generated as a j-th character image of the plurality of character images. Then, a character-creation image in which a plurality of character images including the i-th and j-th character images are arranged is displayed on the display section 190.

In this case, the virtual space setting section 106 sets a light source that performs lighting of the plurality of characters in the virtual space. More specifically, a light source serving as a lighting model to perform lighting of a plurality of characters is set. Examples of the lighting model include Lambert, Phong, and Blinn. The light source is set, for example, at a position corresponding to a representative virtual camera among a plurality of virtual cameras. Then, the display processing section 120 performs a shading process of the plurality of characters based on the light source, thereby generating a plurality of character images. For example, the display processing section 120 performs a process of rendering objects of the plurality of characters by a shading process, such as Gouraud shading or Phong shading, thereby generating a plurality of character images. The shading process can be performed by, for example, a pixel shader.

In addition, the character processing section 110 sets the directions of the plurality of characters relative to the directions of the plurality of virtual cameras based on the operation input by the player. For example, the character processing section 110 performs a process of changing the relative directional relationship, which is a relationship between the directions of the plurality of characters relative to the directions of the plurality of virtual cameras, at once when the player performs an operation input for switching. By doing so, the plurality of character images are collectively changed into character images viewed in different virtual camera directions. Alternatively, the directional relationship between the virtual camera and the character may be switched individually. This individually changes the plurality of character images into character images viewed from different virtual camera directions.

In addition, the character processing section 110 performs a parts setting process with respect to the plurality of characters based on an operation input by the player. For example, the character processing section 110 performs a parts setting process with respect to a plurality of characters so that the parts setting process is reflected on the plurality of character images. For example, the character processing section 110 performs a part switching process, a part content setting process, or a motion data setting process collectively with respect to a plurality of characters. As a result, the parts setting process is reflected on all of the plurality of character images. The parts setting process may be individually performed on each character. As a result, the parts setting process is individually reflected on each of the plurality of character images.

In addition, the display processing section 120 generates, as a plurality of character images, a first character image (i-th character image) viewed from a first virtual camera direction (i-th virtual camera direction) and a second character image (j-th virtual character image) viewed from a second virtual camera direction (j-th virtual camera direction), which is different from the first virtual camera direction. This makes the first character image and the second character image to be viewed from different virtual camera directions.

In this case, the display processing section 120 may change the position of the predetermined part so that the predetermined part in the first character image and that in the second character image differ in position. More specifically, the predetermined part is disposed so that the position thereof in the first character image in which the character is viewed from the first virtual camera direction differs from the position thereof in the second character image in which the character is viewed from the second virtual camera direction. For example, a predetermined part that is disposed at a first position in the first character image is, in the second character image, disposed at a second position shifted from the first position. For example, the position of a predetermined part of an animation character is changed so that it fits to the expression of the animation. For example, the predetermined part is a part constituting the face of the character, such as an eye part, a nose part, a mouth part, or a chin part.

In addition, the display processing section 120 changes the facial expression of at least one character image of the plurality of character images by changing motion data of a part constituting the face. For example, the display processing section 120 changes motion data, which is data of the bones of the parts, so as to change, for example, the shapes of eye parts, nose parts, mouth parts, chin parts, or the like, thereby changing the facial expression of the character in the character image. As a result, for example, a normal face is changed to a smiling face, an angry face, a surprised face, a happy face, a cheerful face, a troubled face, or the like.

Further, when the parts setting process is performed based on an operation input by the player, the display processing section 120 performs a process of displaying, on the display section 190, a character-creation image in which the parts setting process is reflected on a plurality of character images. For example, when the player performs an operation input to execute the part setting process, a character-creation image in which the parts setting process is reflected on a plurality of character images is displayed. For example, a plurality of character images on which all of the parts replacing process, the setting contents changing process, and the motion data changing process are reflected are generated and displayed as a character-creation image.

Further, the display processing section 120 collectively changes the plurality of character images into character images viewed from different virtual camera directions based on an operation input by the player. For example, when the player performs an operation input to execute switching of display of the character image, the plurality of character images are collectively changed. For example, in the case where a plurality of characters are arranged in a virtual space to generate a plurality of character images, the plurality of character images are changed by collectively changing the directions of the plurality of characters relative to the directions of the plurality of virtual cameras. For example, in the case where only one character is disposed in the virtual space to generate a plurality of character images, the plurality of character images are changed by collectively changing the directions of the plurality of virtual cameras relative to the directions of the characters.

Further, the display processing section 120 individually changes the plurality of character images into character images viewed from different virtual camera directions based on an operation input by the player. For example, in the case where the player performs an operation input to execute switching of display of the character images, for example, only one character image of the plurality of character images is changed to a character image in which the character is viewed from a different virtual camera direction. For example, in the case where a plurality of characters are arranged in a virtual space to generate a plurality of character images, the direction of one of the plurality of characters is changed, thereby changing the character image corresponding to the character from among the plurality of character images. In the case where only one character is disposed in a virtual space to generate a plurality of character images, the direction of one of the plurality of virtual cameras is changed, thereby changing the character image viewed from that virtual camera from among the plurality of character images.

In addition, the display processing section 120 generates a plurality of character images so that the predetermined part is displayed in all of the plurality of character images. For example, when a face of a character is displayed as a character image, the main part (predetermined part) of the face is displayed in all of the plurality of character images. For example, the main parts including an eye part, a nose part, a mouth part, and a chin part are always displayed. For example, when the player performs an operation input to switch display of character images to thereby switch the plurality of character images to character images in different directions of the virtual camera, the main part, which is the predetermined part, is displayed in all of the plurality of character images.

In addition, the display processing section 120 generates a plurality of character images in which the first portion is displayed in the first character image and the first portion is not displayed in the second character image. For example, the first portion of a character displayed in the first character image seen from the first virtual camera is not displayed in the second character image seen from the second virtual camera. For example, according to the viewpoint of the virtual camera, some parts of the parts constituting a character are rendered and some parts thereof are not rendered. More specifically, if rendering the first portion, which is preferably rendered at the viewpoint of the first virtual camera, makes the image unnatural at the viewpoint of the second virtual camera, the first portion is not displayed in the second character image that is seen from the second virtual camera.

In this case, for example, the first character image is a character image viewed in the first virtual camera direction, and the second character image is a character image viewed from the second virtual camera direction. That is, the first character image and the second character image are character images viewed from different virtual camera directions. Then, the first part having the first portion and the second part without the first portion are prepared for a single part constituting the character. More specifically, the first part and the second part, i.e., multiple types of parts having different shapes or the like, are prepared for a single part. The information of the first part and the information of the second part are stored in the character information storage section 174 as character information. Then, the display processing section 120 generates the first character image using the first part, as well as the second character image using the second part. More specifically, upon the generation of the first character image viewed from the first virtual camera direction, the first part with the first portion is used, and upon the generation of the second character image viewed in the second virtual camera direction, the second part without the first portion is used. As a result, the first portion is displayed in the first character image and the first portion is not displayed in the second character image.

The game system and processing of the present embodiment shown in FIG. 2 thus described may be modified in various ways, by being implemented by the server system 500 shown in FIG. 1A, by being implemented by the terminal device TM, or by being implemented by distributed processes of the server system 500 and the terminal device TM. Further, the program of the present embodiment may be applied to various programs such as a game program for personal computers, an application program for smartphones, a game program for consumer game devices, a browser game program for smartphones or personal computers, a program for arcade game devices, or the like.

2. Method According to the Present Embodiment

Next, a method according to the present embodiment will be described in detail.

Figure 3:
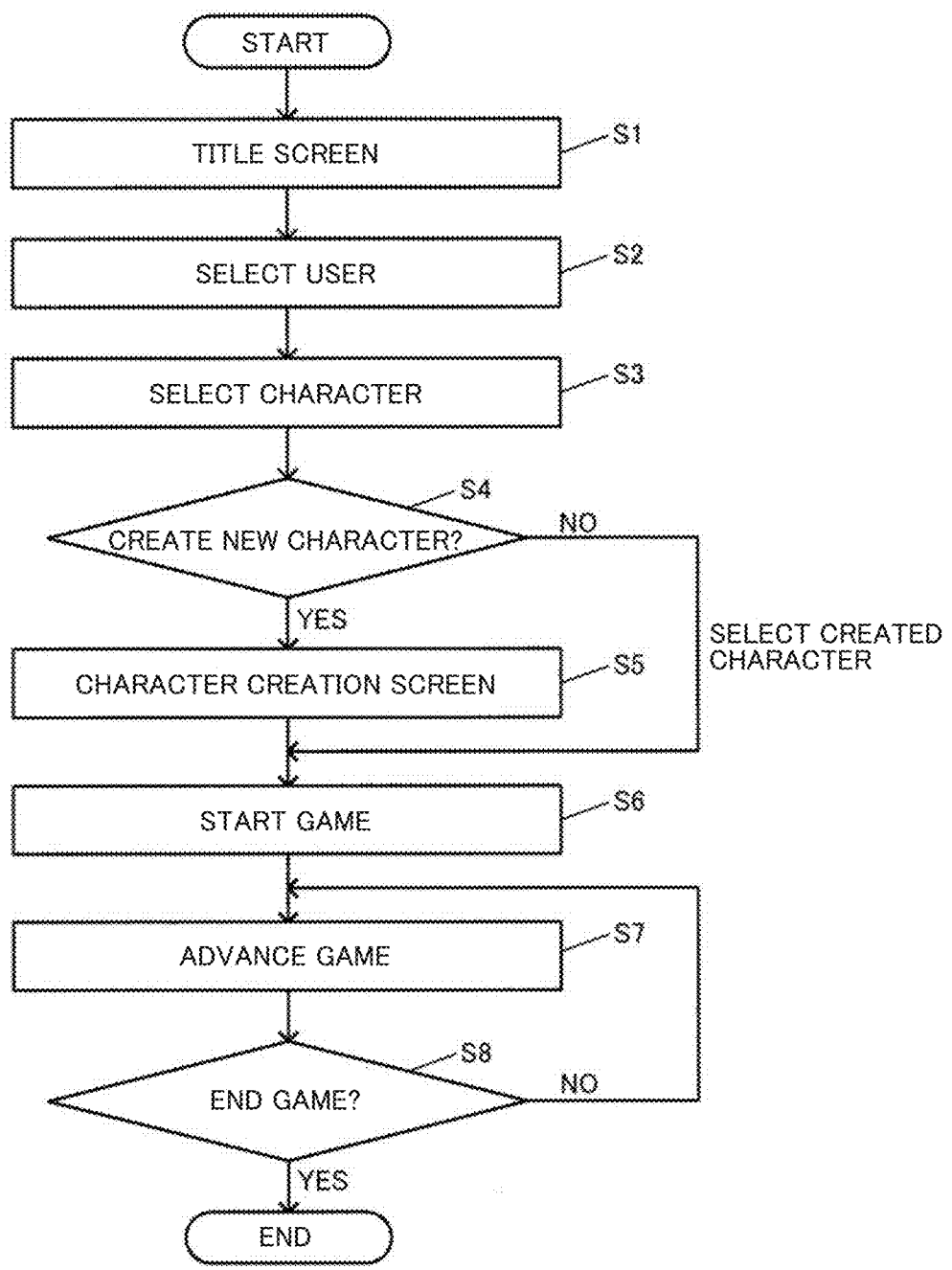
FIG. 3 is a flowchart illustrating the whole process of the present embodiment.

2.1 Character-Creation Image in which a Plurality of Character Images are Arranged In the present embodiment, a character-creation image, which enables a player to create an original character appearing in the game, is displayed to the player. For example, FIG. 3 is a flowchart illustrating an example of the whole process according to the present embodiment.

First, a title screen is displayed (step S1); thereafter, a step of selecting a user and a step of selecting a character are performed (steps S2 and S3). When the player, who is the user, desires to create a new character in the step of selecting a character, a character-creation screen is displayed (steps S4 and S5). In contrast, if the player does not create a new character, the character already created is selected. Then, after the character selection, the game starts (step S6), and a process for advancing the game is performed (step S7). Then, it is determined whether the game has ended (step S8), and if it is determined that the game has ended, the process ends. As described above, in the present embodiment, a character newly created by a player in the process of character creation appears in the game, thereby allowing the player to enjoy the gameplay by using the newly created character as, for example, a player character.

Figure 4:
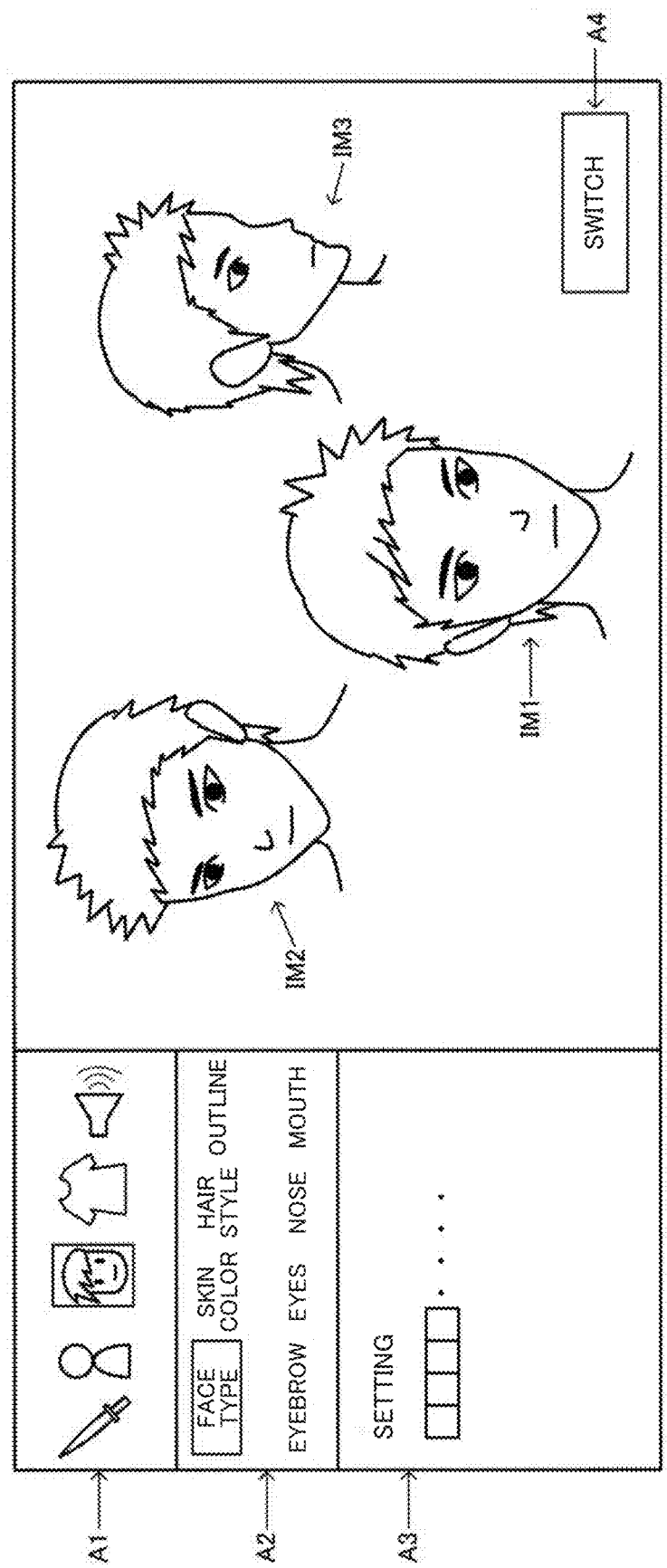
FIG. 4 is an example of a character-creation image.

FIG. 4 is an example of a character-creation image (character-creation screen) according to the present embodiment. As shown in FIG. 4, in the present embodiment, a character-creation image in which a plurality of character images IM1, IM2, and IM3 are arranged is displayed to the player. These character images IM1, IM2, and IM3 are character images of the same character viewed from different virtual camera directions. That is, in the present embodiment, characters are arranged in a virtual space, which is an object space, and a plurality of character images IM1, IM2, and IM3, which are images of the character viewed from a plurality of virtual cameras in the virtual space, are generated. Then, the image in which these character images IM1, IM2, and IM3 are arranged is displayed as an image for character creation. The present embodiment mainly deals with an example using three character images; however, the number of character images may be two or four or more as in the examples shown in FIGS. 16 and 17 described later.

The player can select the class, physique and sex, face and hairstyle, costume, and voice of the character in the operation input area shown in A1 of FIG. 4. The class item enables the player to set, for example, a class representing the ability and the role of the character in a role playing game (RPG). The class is also referred to as the occupation of the character. The physique and sex item enables the player to set the physique and the sex of the character, as described later with reference to FIGS. 16 and 17. The costume item enables the player to set costume parts worn by the character. The voice item enables the player to set the voice of the character. In A1 of FIG. 4, the player selects the face and hairstyle item, thus being able to set the face type, skin color, hairstyle, outline, eyebrows, eyes, noses, mouths, and the like of the character as shown in A2. The player can perform these settings in the operation input area shown in A3. Further, by using the switching icon shown in A4, the player can switch the display in various ways.

Figure 5:
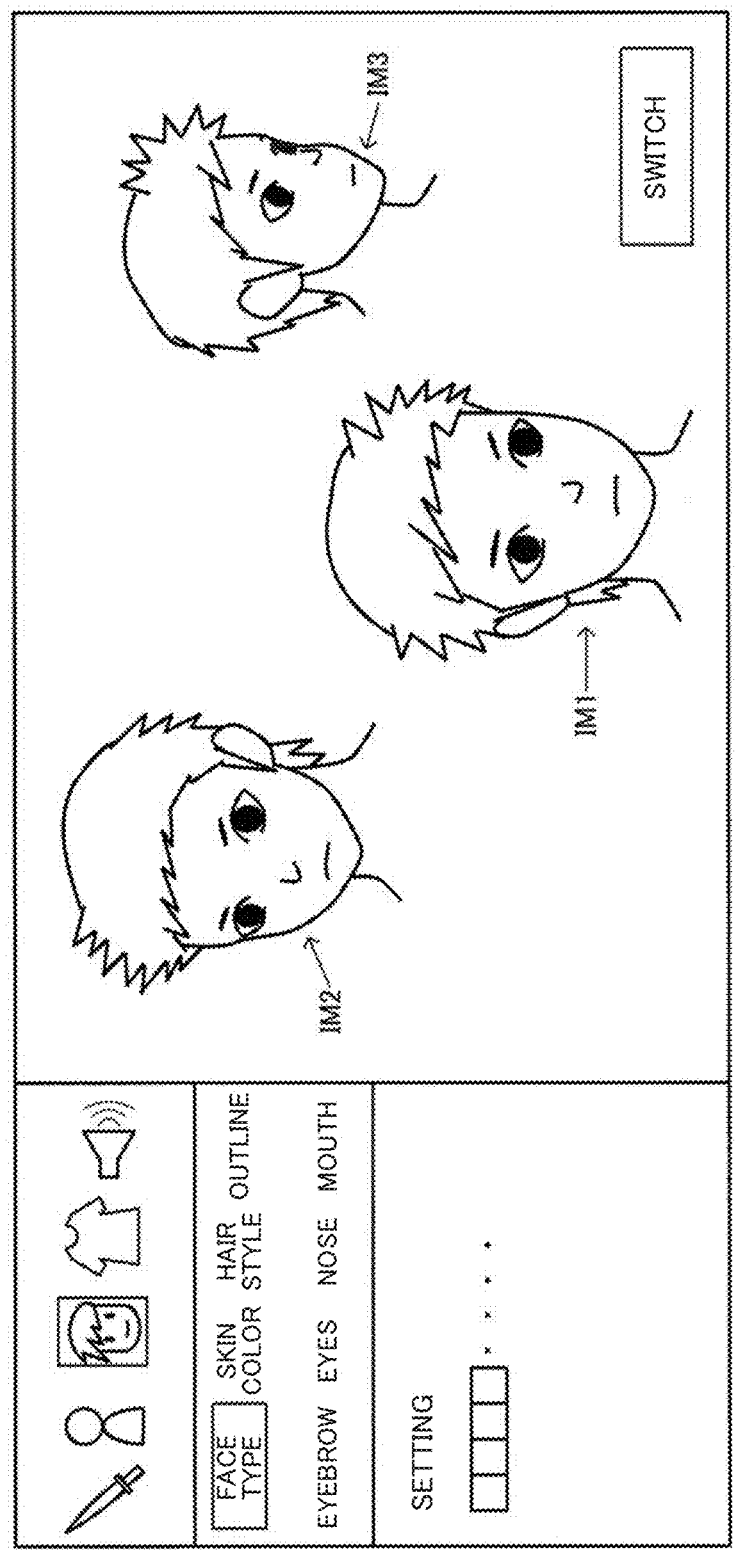
FIG. 5 is an example of a character-creation image.

For example, in FIG. 4, character images of an adult face are displayed as character images IM1, IM2, and IM3. Then, when the player selects, for example, a child face, character images of a child face are displayed as character images IM1, IM2, and IM3, as shown in FIG. 5. Then, when the player selects items such as skin color, hairstyle, outline, eyebrow, eye, nose, or mouth, and performs an operation input to set these parts constituting the character, a character-creation image on which the results of the parts setting process are reflected is displayed.

As described above, in the present embodiment, the operation input by the player is received, and the parts setting process for setting the parts constituting the character is performed based on the operation input by the player. That is, the player performs click or touch operation in the operation input area shown in A1, A2, and A3 of FIG. 4, or clicks or touches the switching icon in A4. This operation input by the player is received, and a parts setting process such as a process for replacing or changing the body parts, costume parts, or equipment parts constituting the character is performed. Moreover, in the present embodiment, at least one character and a plurality of virtual cameras are arranged in a virtual space, and a plurality of character images IM1, IM2, and IM3, which are images of the character viewed from a plurality of virtual cameras, are generated in the virtual space, as shown in FIG. 4. Then, a character-creation image in which these character images IM1, IM2, and IM3 are arranged is displayed to the player. Then, when the parts setting process is performed by way of an operation input by the player, a character-creation image on which the results of the parts setting process are reflected is displayed. For example, when a parts setting process, such as a process of replacing a body part or a costume part is performed, the results of the setting process are reflected on the character images IM1, IM2, and IM3 in the character-creation image.

For example, in the past character creation, only one character image is displayed as the character-creation image. Therefore, for example, when the player replaces a part of the character, the player can confirm the results of the replacement with only one character image. Therefore, the player cannot sufficiently confirm or consider whether the image of the character after the replacement of the part or the like suits the player's taste or preference.

In this case, it is also possible to, for example, enable the player to perform an operation of rotating the character, thereby displaying a character image in which the character is rotating. For example, the character image in which the character is rotating can be generated by moving a virtual camera that gazes at the character on the circumference around the character.

However, since this method requires the player to perform an operation of rotating the character while checking how the character image looks like in each direction, the work efficiency of the player decreases. More specifically, the method requires the player to perform an operation of checking whether the part(s) attached to the character by the player matches his/her preference while keeping rotating the character. Therefore, the player needs to perform a complicated operation.

In particular, in character creation, the player desires to create an original character that does not look like another character created by another player. For this reason, it is desirable to enable the player to perform more detailed parts setting for the character. However, if the player needs to perform the complicated confirmation described above in such a detailed parts setting, the player must go through such complicated operations in character creation. This is not desirable in terms of giving a desirable interface environment to the player.

Therefore, in the present embodiment, as shown in FIG. 4, for example, a character-creation image in which a plurality of character images IM1, IM2, and IM3 are arranged in various virtual camera directions is displayed to the player. Then, when the player performs an operation input to execute, for example, replacement of a part, a character-creation image in which the setting process such as replacing the part is reflected on the character images IM1, IM2, and IM3 is displayed to the player. This enables the player to check whether the character image after the parts setting suits his/her preference or taste by looking at the plurality of character images IM1, IM2, and IM3 of the character-creation image, for example, only once. This improves the operation efficiency of the player, thereby suppressing complication of the player's operation in the character creation. This enables the player to perform stress-free operations even in the detailed parts setting, and the player can easily create an original character that does not look like ones created by other players, thereby improving interface environment of the player in character creation.

2.2 Process for Generating Character Image

Figure 6:
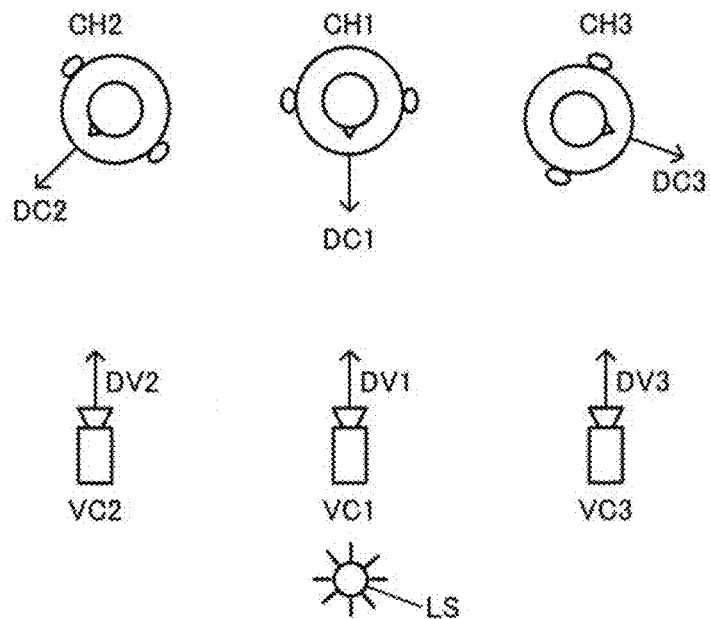
FIG. 6 is an explanatory view of a method of arranging characters and virtual cameras.

A specific example of a process for generating a character image is described below. In the present embodiment, as shown in FIG. 6, a plurality of characters CH1, CH2, and CH3 are arranged in the virtual space. These characters CH1, CH2, and CH3 are characters of the same model to be subjected to character creation by the player. More specifically, the characters CH1, CH2, and CH3 are of the same shape model. In the present embodiment, a plurality of virtual cameras VC1, VC2, and VC3 are set for the plurality of characters CH1, CH2, and CH3. That is, each of the virtual cameras VC1, VC2, and VC3 is arranged corresponding to each of the characters CH1, CH2, and CH3. For example, VC1 is disposed as a virtual camera for gazing at the character CH1, VC2 is disposed as a virtual camera for gazing at the character CH2, and VC3 is disposed as a virtual camera for gazing at the character CH3. Then, images in which each character of the plurality of characters CH1, CH2, and CH3 is viewed from each virtual camera of the plurality of virtual cameras VC1, VC2, and VC3 are generated as the plurality of character images IM1, IM2, and IM3 of FIG. 4. That is, the character image IM1 is an image of the character CH1 viewed from the virtual camera VC1. The character image IM2 is an image of the character CH2 viewed from the virtual camera VC2, and the character image IM3 is an image of the character CH3 viewed from the virtual camera VC3.

In this way, the plurality of character images IM1, IM2, and IM3 viewed from different virtual camera directions can be generated by a simple process. For example, in FIG. 6, the direction DC1 of the character CH1 is parallel to and opposite to the direction DV1 (line-of-sight direction) of the virtual camera VC1. Thus, as shown in FIG. 4, an image of a front face is generated as the character image IM1. Further, the direction DC2 of the character CH2 is oriented leftward (clockwise) with respect to the direction DV2 of the virtual camera VC2; therefore, as shown in FIG. 4, an image of a left profile is generated as the character image IM2. Further, the direction DC3 of the character CH3 is oriented rightward (anticlockwise) with respect to the direction DV3 of the virtual camera VC3; therefore, as shown in FIG. 4, an image of a right profile is generated as the character image IM3.

As shown above, with the method of FIG. 6, character images viewed from different directions can be generated as the plurality of character images IM1 to IM3 by setting the directions of the characters CH1 to CH3 with respect to the directions DV1 to DV3 of the virtual cameras VC1 to VC3. This enables the player to collectively confirm the character images in various directions, thereby improving operation efficiency in character creation.

Further, in FIG. 6, the light source LS that performs lighting of the characters CH1 to CH3 is set in the virtual space. For example, a light source LS by means of an illumination model such as Lambert, Phong, or Blinn is provided. For example, in FIG. 6, the light source LS is set near the virtual camera VC1 for the image of the front face. Then, a shading process with respect to the characters CH1 to CH3 is performed based on the light source LS to generate the character images IM1 to IM3. For example, a process of rendering the objects (polygons constituting the objects) of the characters CH1 to CH3 is performed by way of a shading process, such as Gouraud shading or Phong shading, thereby generating the character images IM1 to IM3. This makes it possible to generate images of the characters shaded by the light source LS, thereby generating realistic character images. More specifically, it becomes possible to generate character images with realistic shading as in the character images appearing in the game, thereby displaying more appropriate and realistic character-creation images to the player.

Further, in the present embodiment, as explained with reference to later-described FIG. 13 and the like, the directions DC1 to DC3 of the plurality of characters CH1 to CH3 with respect to the directions DV1 to DV3 of the plurality of virtual cameras VC1 to VC3 in FIG. 6 are set based on an operation input by the player. For example, the angle formed by the directions DV1 to DV3 of the virtual cameras VC1 to VC3 and the directions DC1 to DC3 of the characters CH1 to CH3 is changed in accordance with the operation input by the player. This makes it possible to change the facing directions of the characters in the character images IM1 to IM3 according to the operation input by the player, thereby displaying the character images IM1 to IM3 suitable for character creation to the player.

For example, in the present embodiment, when the player performs an operation input for switching images, the directions DC1 to DC3 of the characters CH1 to CH3 with respect to the directions DV1 to DV3 of the virtual cameras VC1 to VC3 are collectively switched. That is, the angles formed by the directions DV1 to DV3 and the directions DC1 to DC3 are collectively switched. In this way, the character images IM1 to IM3 are simultaneously switched to character images viewed from different directions simply by the switching operation by the player, thereby improving operation efficiency of the player in character creation.

Figure 7:
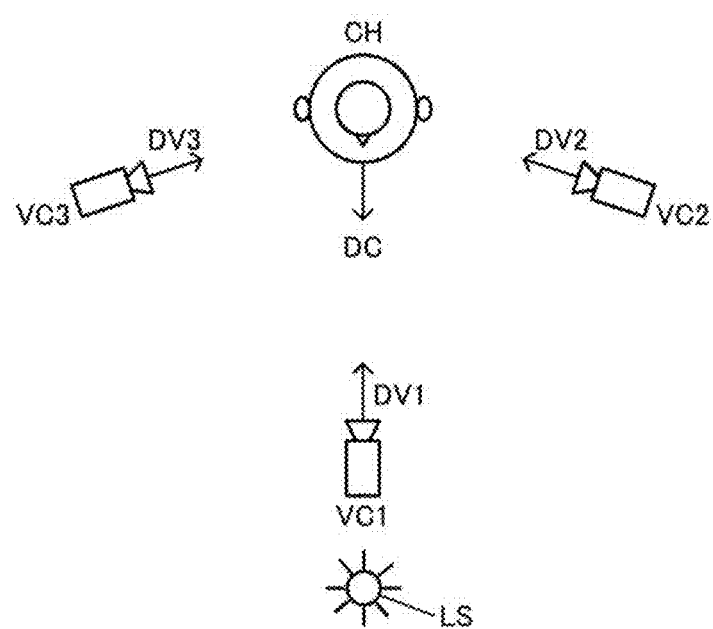
FIG. 7 is an explanatory view of another method of arranging characters and virtual cameras.

Although the plurality of characters CH1 to CH3 corresponding to the plurality of character images IM1 to IM3 are arranged in the virtual space in FIG. 6, as shown in FIG. 7, the plurality of character images IM1 to IM3 may be generated by disposing only one character CH in the virtual space. For example, in FIG. 7, a plurality of virtual cameras VC1, VC2, and VC3 are set to gaze at a single character CH. The directions DV1, DV2 and DV3 (line-of-sight directions) of the virtual cameras VC1, VC2 and VC3 are oriented toward the single character CH. In this way, an image viewed from the virtual camera VC1 disposed in front of the character CH can be generated as the character image IM1. In addition, an image viewed from the virtual camera VC2 disposed diagonally forward left of the character CH can be generated as the character image IM2, and an image viewed from the virtual camera VC3 disposed diagonally forward right of the character CH can be generated as the character image IM3. More specifically, as shown in FIG. 4, images of the front face, the left profile, and the right profile can be generated as the character images IM1, IM2, and IM3.

However, the method of FIG. 7 is disadvantageous compared to the method of FIG. 6 when the shading process based on the light source LS is performed. More specifically, the method of FIG. 6 makes it possible to generate not only an image of the front face but also images of the left profile and the right profile, which are more appropriately shaded. On the other hand, with the method of FIG. 7, although the character image IM1 showing the front face has appropriate brightness, the character image IM2 showing the left profile and the character image IM3 showing the right profile are dark. That is, although the front side of the character CH is brightly shaded by the light source LS that is set near the virtual camera VC1, the left side surface and the right side surface of the character CH appear dark in the images because they are less likely to receive the light from the light source LS positioned in the front direction. Therefore, in this sense, it is desirable to generate the character images IM1 to IM3 by the method of FIG. 6.

Figure 8:
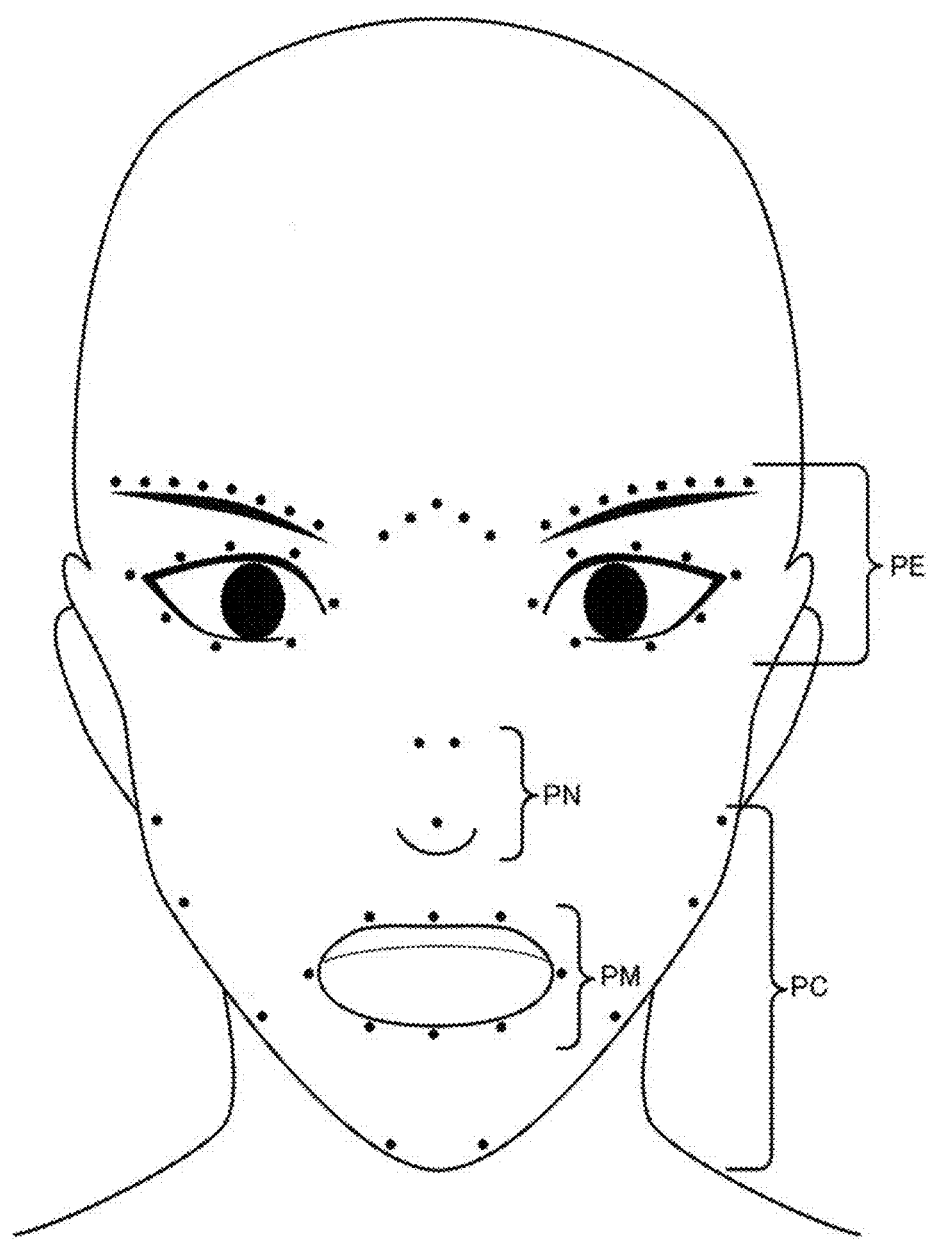
FIG. 8 is an explanatory view of parts constituting a face.

FIG. 8 is an explanatory view of parts constituting a character face. In FIG. 8, the face of the character is constituted of an eye part PE, a nose part PN, a mouth part PM, and a chin part PC (outline part). The points in FIG. 8 represent the positions of bones in the motion data, and more specifically represent the positions of joints of the bones. By changing the positions of these bones based on the motion data, the shapes of the parts PE, PN, PM, and PC are changed. This makes it possible to change the face expression or the like of the character. For example, for the eye part PE, the shapes of the eyebrows of the character can be changed in various ways by changing the positions (joint positions) of the bones set for the eyebrows. For the eye part PE, the shapes of the edges of the eyelids of the character can be changed in various ways by changing the positions of the bones set for the shapes of the edges of the eyelids (eye holes, eye sockets). Further, the outline shape of the chin can be changed in various ways by changing the positions of the bones set for the chin part PC. The mouth part PM has predetermined tongue part models and bone part models in which bones are set not only for the palate but also for the tongue, teeth, and the like.

Figure 9:
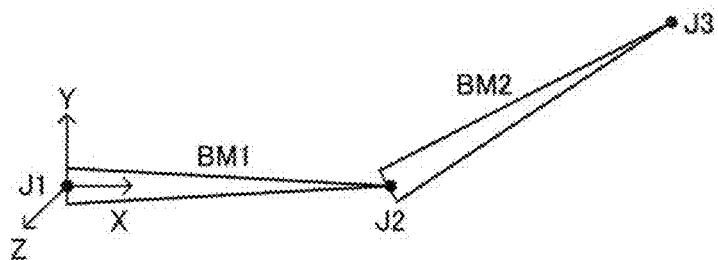
FIG. 9 is an explanatory view of bone data.

FIG. 9 is an explanatory view of bone data set for (various) parts. The bone data corresponds to motion data of characters, and can be represented by, for example, bone positions J1 and J2, which designate the joint positions. The bone data may also be represented by rotation angles around the X-, Y-, and Z-axes of a child bone (BM2) with respect to a parent bone (BM1). The bone data may also include scaling parameters in the X-axis, Y-axis, and Z-axis directions. The X-axis extends in a direction along the bone. The Y- and Z-axes are orthogonal to the X-axis. For example, by changing the value of scaling in the X-axis direction, it is possible to adjust the height of the character, which is described later with reference to FIGS. 16 and 17. By changing the value of scaling in the Y-axis direction and the Z-axis direction, it is possible to adjust the thickness (build) of the body part of the character.

For example, a weight value for each bone of each part of the character is set at each vertex of the object of a part constituting the character. The vertex of the object of a part follows the bone based on the movement amount corresponding to the weight value. Therefore, by controlling the bone data as motion data, it is possible to set the posture of the character, the shape (expression) of the part, or the like.

In the present embodiment, the parts setting process is executed with respect to the plurality of characters CH1 to CH3 in FIG. 6 based on an operation input by the player. More specifically, in FIG. 6, the plurality of characters CH1 to CH3 of the same shape model are arranged in the virtual space in order to generate the character images IM1 to IM3. Then, when the player performs an operation input, such as a part switching operation, in order to perform character creation, the parts setting processing, such as the part switching process, is executed with respect to the plurality of characters CH1 to CH3. For example, when an operation input for replacing the first part is performed, the replacing process of the first part is executed for all of the characters CH1 to CH3. In this way, the replacement of the part is performed also with respect to the character images IM1 to IM3. This enables the player to perform the operation of character creation while checking the character images IM1 to IM3 after the replacement of the part, thereby enabling the player to perform character creation with high operation efficiency.

In addition, in the present embodiment, the facial expression of at least one character image of the plurality of character images is changed by changing motion data of a part constituting the face.

Figure 10:
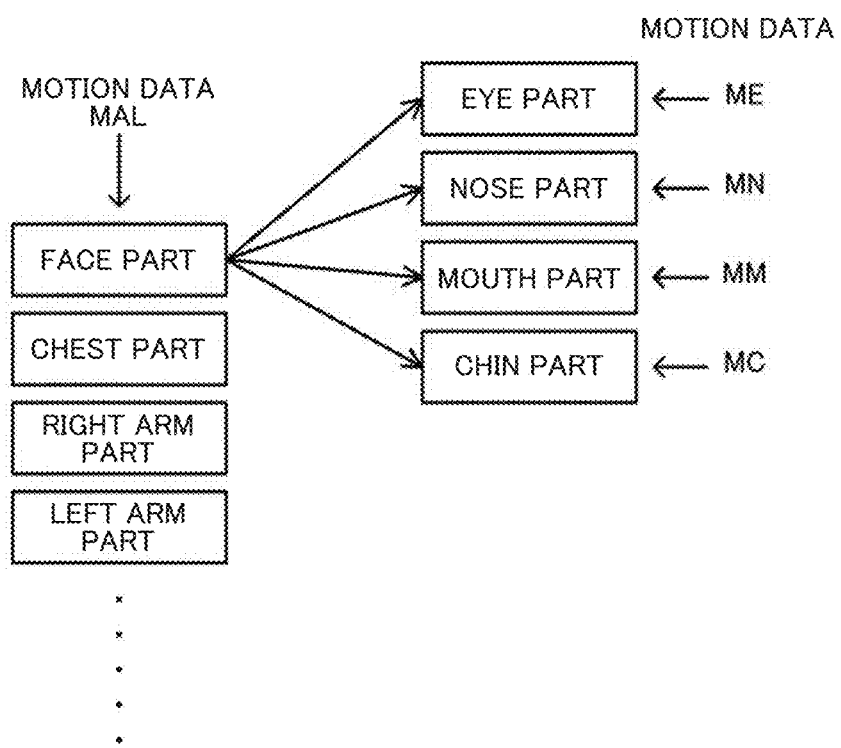
FIG. 10 is an explanatory view of part information of a character.

For example, FIG. 10 is an explanatory view showing an example of part information of a character. The part information is stored in the character information storage section 174 in FIG. 2 as character information. The movements of the body parts, such as the face part, the chest part, the right arm part or the left arm part of the character are controlled by motion data MAL for setting the entire posture of the character. In FIG. 10, the face part is constituted of an eye part, a nose part, a mouth part, and a chin part. The shapes of the eye part, the nose part, the mouth part, and the chin part are controlled by the motion data ME, MN, MINI, and MC, respectively. More specifically, the setting of the motion data ME, MN, MINI, and MC enables setting of the facial expression of the character.

For example, when the facial expression of the character is changed from a normal face to a smiling face, the motion data ME, MN, MINI, and MC of the eye part, the nose part, the mouth part, and the chin part are set to the motion data corresponding to the smiling face. In other words, the motion data is set so that the shapes of the eyes, the nose, the mouth, and the chin have the forms for a smile. Similarly, when the facial expression of the character is changed from a normal face to an angry face, the motion data ME, MN, MM, and MC of the eye part, the nose part, the mouth part, and the chin part are set to the motion data corresponding to the angry face. In this way, it is possible to change the facial expression of the character in various ways by a light-load process, i.e., by setting motion data, thereby, for example, reducing or simplifying the character-creation process.

In addition, the present embodiment generates, as a plurality of character images, the first character image viewed from the first virtual camera direction and the second character image viewed from the second virtual camera direction, which is different from the first virtual camera direction. For example, one of the character images IM1 to IM3 in FIG. 4 is the first character image, and another one is the second character image. For example, the character image IM1 is assumed to be the first character image, and the character image IM2 is assumed to be the second character image. In this case, in FIG. 6, the first character image is an image of the character CH1 viewed from the direction DV1, which is the first virtual camera direction, and the second character image is an image of the character CH2 viewed from the direction DV2, which is the second virtual camera direction. Further, in FIG. 7, the first character image is an image of the character CH viewed from the direction DV1, which is the first virtual camera direction, and the second character image is an image of the character CH viewed from the direction DV2, which is the second virtual camera direction. In this way, a plurality of character images viewed from different virtual camera directions can be displayed to the player as a character-creation image.

In this case, the predetermined part may be disposed so that the predetermined part in the first character image, which is an image viewed from the first virtual camera direction, and the predetermined part in the second character image, which is an image viewed from the second virtual camera direction, differ in position.

Figure 11A:
FIGS. 11A and 11B are explanatory views of a method of changing positions of predetermined parts.

For example, in FIG. 11A, the virtual camera is set in a direction from the lower side of the character toward the character, and so-called a worm's eye view image of the character's face is generated. In this case, if the positions and the shapes of the nose part PN, the mouth part PM, and the chin part PC are the same as those of a normal face, the resulting face may look unnatural. For example, the nose and the mouth may be disposed at unnatural positions or the chin may have an unnatural outline.

Figure 11B:
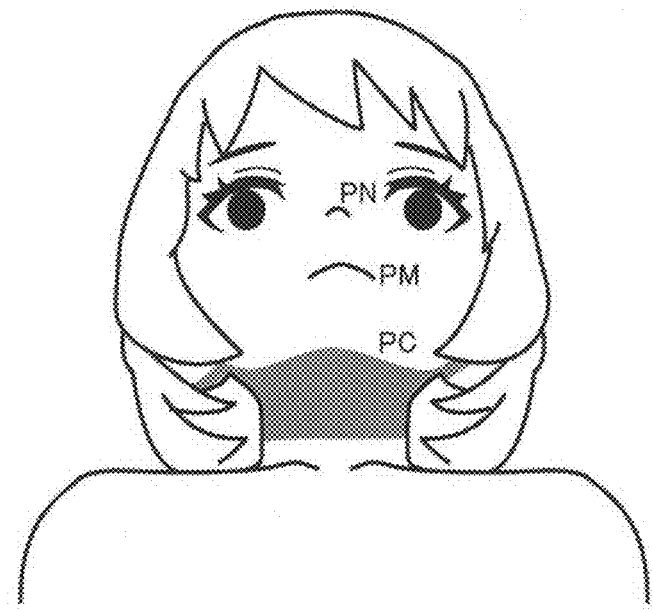

Therefore, in the present embodiment, when such a worm's eye view image of a character face is generated, as shown in FIG. 11B, for example, the positions of the nose part PN and the mouth part PM are moved downward. That is, in FIG. 11B, the positions of the nose part PN and the mouth part PM are moved to a lower position of the face, as compared with FIG. 11A. The shape of the top end of the chin part PC is also changed to be gentler convex. By doing so, for example, even when the virtual camera direction changes from the normal face direction (first virtual camera direction) to the worm's eye view direction (second virtual camera direction), it is possible to generate more natural worm's eye view image of the character's face. Similarly, for example, in the case where a profile image of an animation character is generated, if the mouth part PM is disposed at a position similar to that of a normal face, the resulting character image may look unnatural in terms of an animation image. Therefore, also in this case, for the character's profile image, it is desirable to perform a process of moving the position of the mouth part PM to, for example, the cheek side.

Figure 12:
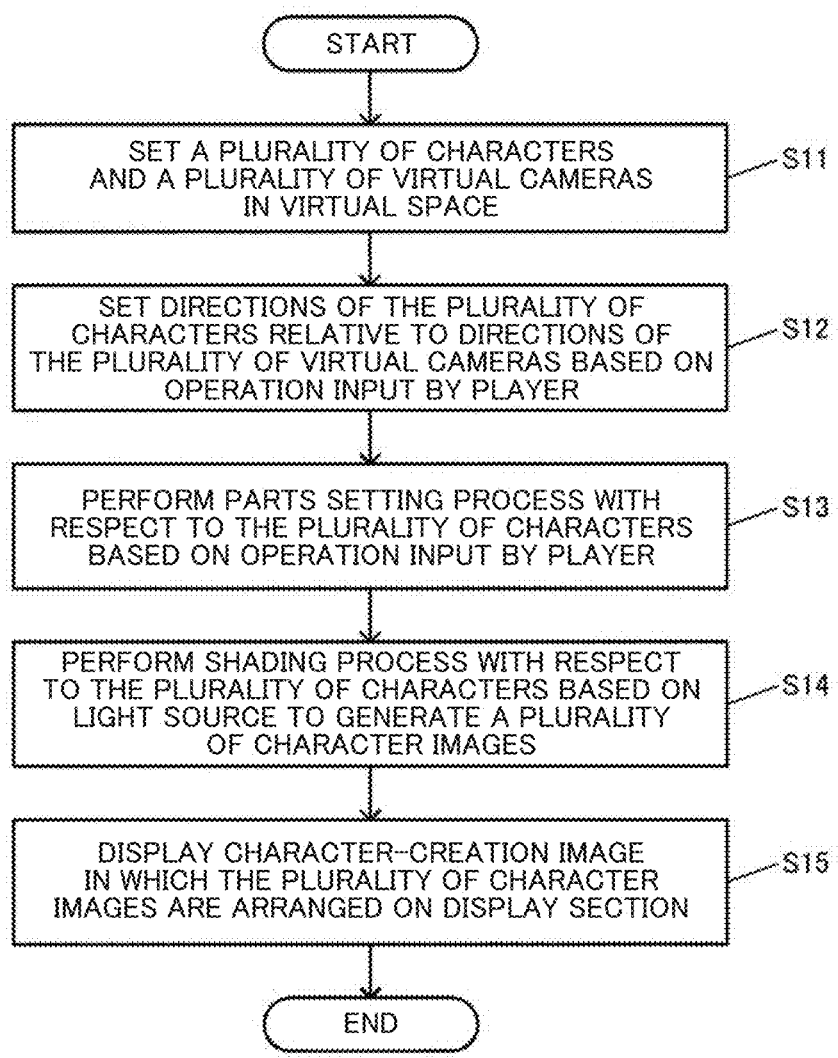
FIG. 12 is a flowchart explaining detailed processing according to the present embodiment.

FIG. 12 is a flowchart explaining an example of detailed processing according to the present embodiment. First, a plurality of characters and a plurality of virtual cameras are set in a virtual space (step S11). More specifically, as shown in FIG. 6, a plurality of characters CH1 to CH3 of the same shape model are arranged in the virtual space, and virtual cameras VC1 to VC3 for the characters CH1 to CH3 are arranged.

Next, the directions of the plurality of characters relative to the directions of the plurality of virtual cameras are set based on an operation input by the player (step S12). For example, in FIG. 6, the directions DC1 to DC3 to which the characters CH1 to CH3 are oriented relative to the directions DV1 to DV3 of the virtual cameras VC1 to VC3 are set. For example, when the player performs an image switching operation, the relative directional relationship between the directions DV1 to DV3 and the directions DC1 to DC3 is collectively changed.

Next, a parts setting process is performed with respect to a plurality of characters based on an operation input by the player (step S13). For example, in FIG. 6, when the player performs an operation input for replacing a predetermined part, the predetermined part of each of the characters CH1 to CH3 representing characters of the same model are collectively replaced.

Next, a shading process is performed with respect to the plurality of characters based on the light source, thereby generating a plurality of character images (step S14). For example, in FIG. 6, a shading process is performed with respect to the character CH1 based on the light source LS to generate a character image EVIL Similarly, a shading process is performed with respect to each of the characters CH2 and CH3 based on the light source LS to generate character images IM2 and IM3. Then, the character-creation image in which the plurality of character images are arranged is displayed on the display section 190 (step S15). More specifically, a character-creation image in which the character images IM1 to IM3 are arranged in a predetermined form as shown in FIGS. 4 and 5 is displayed to the player.

2.3 Examples of Character-Creation Image

Various examples of character-creation image are described below. FIG. 13 is an example of a character-creation image when a player performs an image switching operation by operating a switching icon or the like. For example, when the player performs the image switching operation in a state where the character-creation image of FIG. 4 is displayed, the character-creation image shown in FIG. 13 is displayed. In the character images IM1 to IM3 of FIG. 13, the characters are facing a direction different from that of FIG. 4. More specifically, in FIG. 13, the character images IM1 to IM3 viewed from a virtual camera direction different from that of FIG. 4 are displayed. Such switching of the character images IM1 to IM3 can be performed, for example, in the case of FIG. 6, by collectively changing the directions DC1 to DC3 of the characters CH1 to CH3 with respect to the directions DV1 to DV3 of the virtual cameras VC1 to VC3. Further, in the case of FIG. 7, the switching can be done by collectively changing the directions DV1 to DV3 of the virtual cameras VC1 to VC3 with respect to the character CH.

Figure 13:
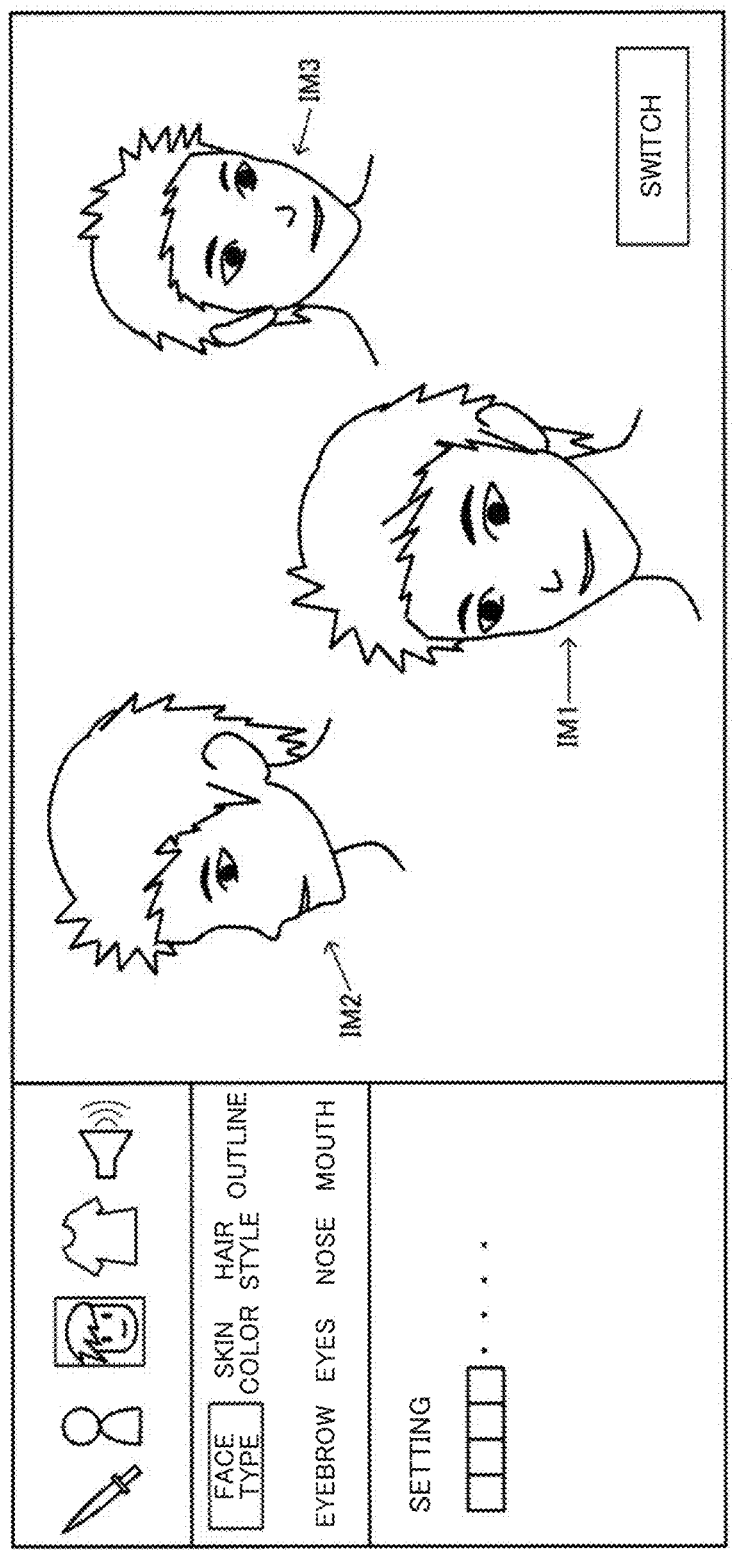
FIG. 13 is an example of a character-creation image.

As described above, in the present embodiment, as shown in FIGS. 4 and 13, the plurality of character images IM1 to IM3 are collectively changed into character images viewed from different virtual camera directions based on an operation input by the player. This enables the player to collectively change the facing directions of the characters in the character images IM1 to IM3 by performing a simple operation, such as an image switching operation. Thus, the player can confirm whether the parts setting or the like performed in the character creation suits his/her preference or taste by a simple operation, thereby improving the interface environment of the player in character creation.

Figure 14:
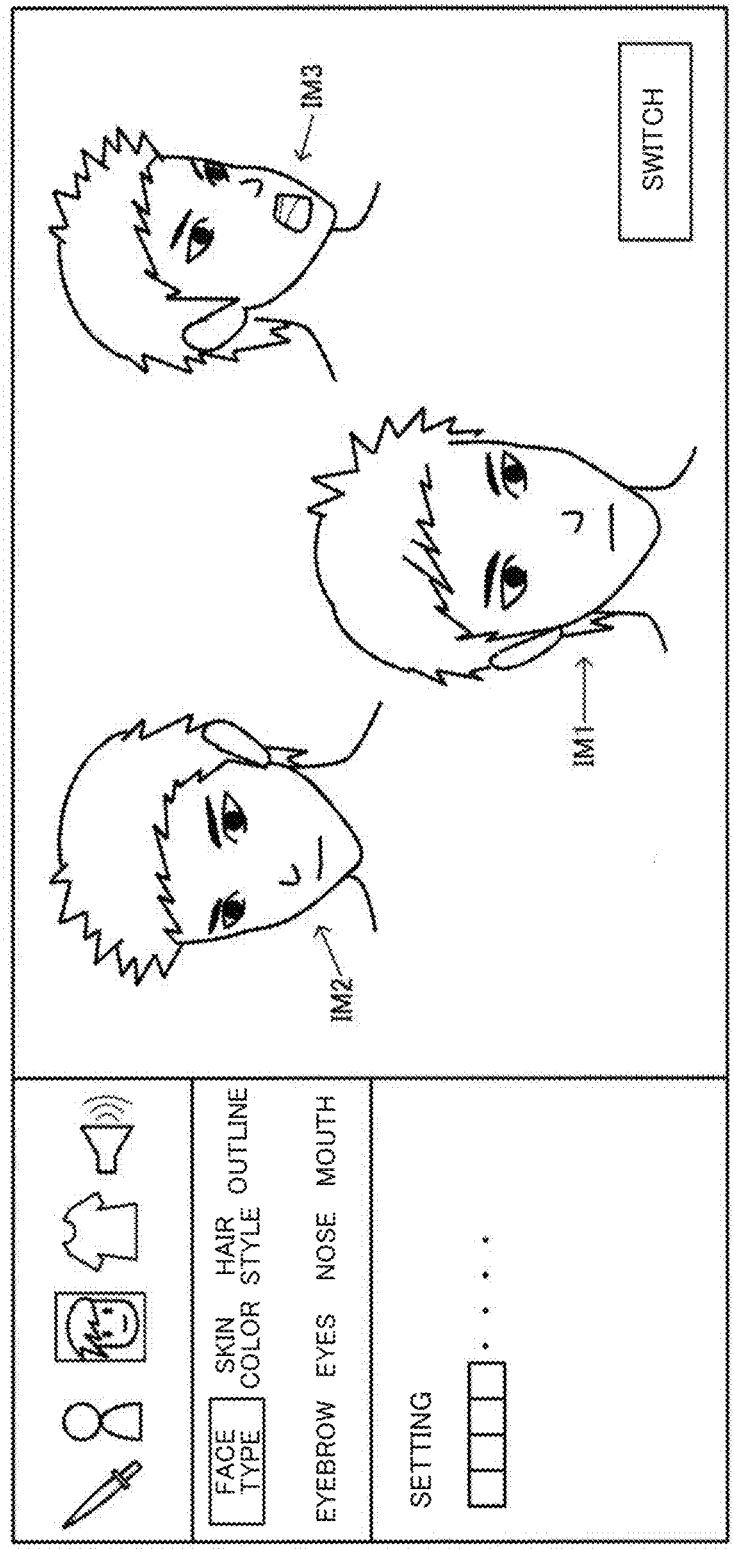
FIG. 14 is an example of a character-creation image.

Further, although the plurality of character images IM1 to IM3 are collectively changed into character images viewed from different virtual camera directions in FIG. 14, the method of the present embodiment is not limited to this example. For example, it is also possible to individually change the plurality of character images IM1 to IM3 into character images viewed from different virtual camera directions based on an operation input by the player. For example, only one character image of the plurality of character images IM1 to IM3 is changed into a character image viewed from a different virtual camera direction. For example, in FIG. 6, when only the character image IM3 is changed individually, only the direction DC3 of the character CH3 with respect to the direction DV3 of the virtual camera VC3 is changed based on an operation input of the player, without changing the directions DC1 and DC2 of the other characters CH1 and CH2. Further in the case of FIG. 7, only the direction VD3 of the virtual camera VC3 with respect to the character CH is changed, without changing the directions DV1 and DV2 of the other virtual cameras VC1 and VC2. This makes it possible to individually change the facing direction of the character in the character image for which the player would like to check the details. This satisfies various requirements from the player in character creation, thereby improving the operation efficiency or the like of the player.

In FIG. 14, the facial expression of the character in the character image IM3 is changed. More specifically, in the character image IM3 of FIG. 4, the character has a normal face expression; however, the face expression is changed to an angry face in the character image of FIG. 14. More specifically, as described with reference to FIGS. 8 to 10, the facial expression of the character is changed by changing the motion data of the parts constituting the face. For example, by changing motion data corresponding to the bone data in the eye part, the nose part, the mouth part, or the chin part, the shapes of these parts are changed, thereby changing the facial expression of the character. In this way, in the present embodiment, the facial expression of at least one character image of the plurality of character images is changed by changing motion data of a part constituting the face. In this way, the facial expression of the character can be changed by a simple process of controlling motion data. For example, as a method of changing the facial expression, it is possible to perform a replacing process with respect to each part of the face of the character. However, in this method, it is necessary to prepare parts corresponding to all expressions for each character, thereby significantly increasing the data amount of the parts. In contrast, according to the method of the present embodiment in which motion data of the parts constituting the face is changed, the process of changing the facial expression of the character can be performed with a small amount of data, thereby saving the data storage capacity or the like.

Also in FIG. 13, the facial expression of the character is changed from that in FIG. 4. More specifically, the normal facial expression of FIG. 4 is changed to a smiling facial expression in FIG. 14. For example, the facial expression of the character is changed at once based on an operation input of the player. As is clear from the above, the number of character images to be changed in facial expression is not limited to one. It is also possible to collectively change the facial expressions of a plurality of character images based on an operation input or the like of the player.

Figure 15:
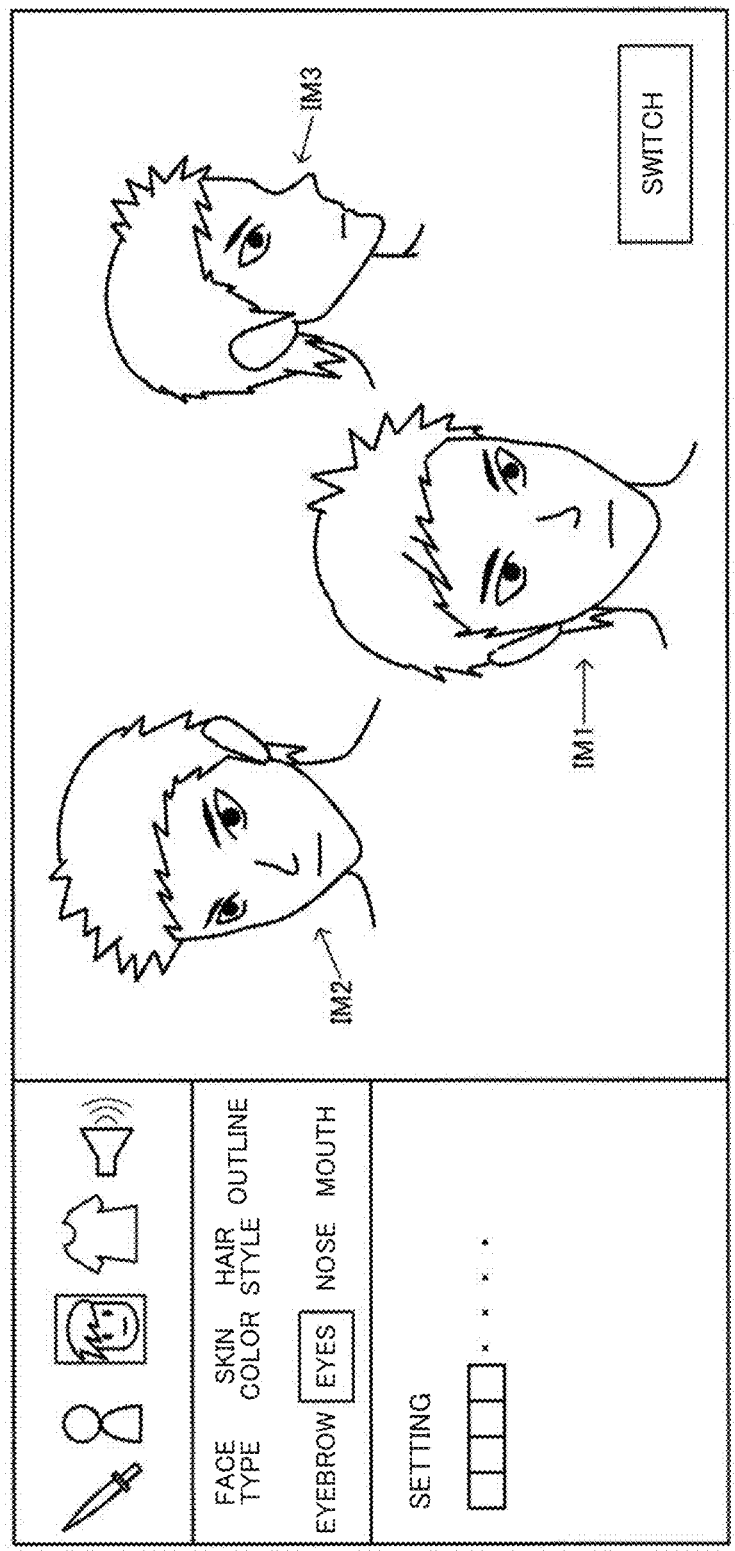
FIG. 15 is an example of a character-creation image.

In FIG. 15, a process of replacing the parts of the character is performed. For example, in FIG. 15, the eye part and the nose part of the character are different from those of FIG. 4. For example, the normal eye part of FIG. 4 is replaced with a slant eye part in FIG. 15. Further, in FIG. 15, the nose part is replaced with a nose part having a higher height, compared with the nose part of FIG. 4.

As described above, in the present embodiment, when a setting process such as a parts replacing process is performed based on an operation input by the player, the character-creation image on which the parts setting process with respect to the plurality of character images IM1 to IM3 is reflected is displayed. For example, in FIG. 6, when the player instructs to replace a predetermined part, a process of replacing the predetermined part is performed with respect to all of the characters CH1 to CH3. For example, when the player instructs to replace a normal eye part with a slant eye part, a process of replacing a normal eye part with a slant eye part is performed with respect to all of the characters CH1 to CH3. For example, when the player instructs to replace a normal nose part with a high nose part, a process of replacing a normal nose part with a high nose part is performed with respect to all of the characters CH1 to CH3. In this way, it is possible to perform a part setting process, such as a parts replacing process, with respect to all of the plurality of character images IM1 to IM3 at once based on an instruction made by an operation input by the player.

For example, in a method according to a comparative example in which only one character image is displayed as a character-creation image, it is necessary to repeat an operation of changing the orientation of the character to check the appearance of the character image after the parts setting of the character many times, which makes the operation of the player in character creation more complicated. In contrast, the present embodiment enables the player to simultaneously check how the parts setting process is reflected in the plurality of character images to IM3. This improves the operation efficiency of the player compared with the method of the comparative example, thereby providing a desirable interface environment to the player in character creation.

In addition, in the present embodiment, a plurality of character images are generated so that the predetermined part is displayed in all of the plurality of character images. For example, when the player performs an operation input to switch images, for example, so as to change the virtual camera direction, the predetermined part is displayed in all of the plurality of character images. For example, for the character face images IM1 to IM3 in FIGS. 4, 5, and 13 to 15, the eye part, the mouth part, the nose part, and the chin part are regarded as main parts of the face, i.e., predetermined parts. Accordingly, these parts are displayed in all of the character images IM1 to IM3 even when an image switching operation or the like is performed. As a result, the predetermined parts, such as the main parts, are always displayed in the character images IM1 to IM3, thus enabling the player to appropriately perform parts setting, such as replacing the predetermined parts.

The predetermined part is not limited to the main part, and may be any part that is assumed to be of interest for the player. For example, a part that has just been worn by the player is always displayed as a part of interest. More specifically, when the player obtained and wore a costume part or an equipment part, such as a weapon or a protection, the part is always displayed as a part of interest for a predetermined period. For example, when a predetermined part such as a part of interest becomes invisible due to a change in the virtual camera direction, the direction of the virtual camera or the direction of the character is automatically switched to a direction corresponding to the opposite direction so that the predetermined part is always displayed.

Figure 16:
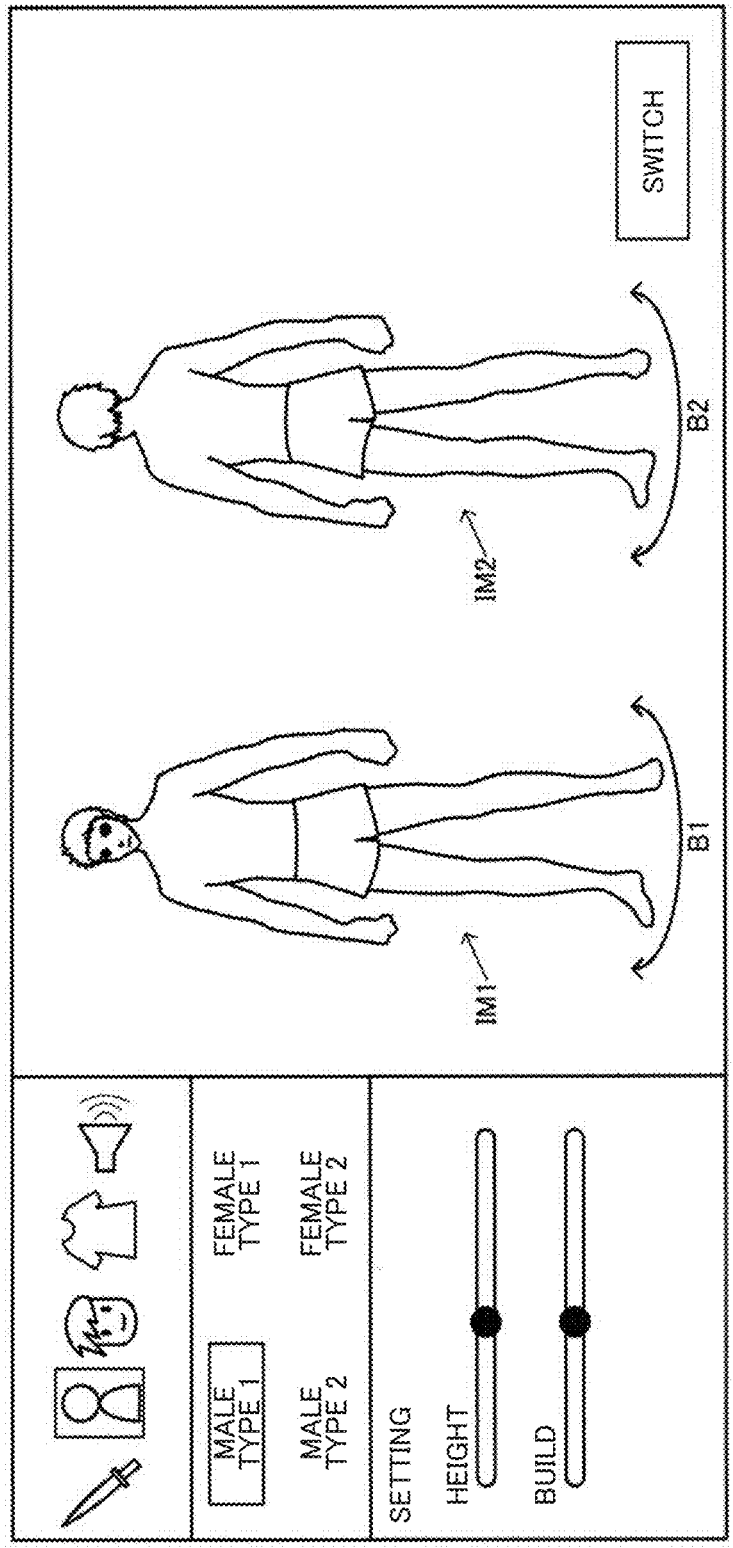
FIG. 16 is an example of a character-creation image showing an image of the whole body of a character.

Although the case where the character image is a face image of a character and two character images are displayed in the character-creation image has been described above, the present embodiment is not limited to this example. For example, in FIG. 16, the whole body of the character is displayed in the character images IM1 and IM2, and the number of character images is two. In FIG. 16, the character image IM1 is a whole body image facing forward, and the character image IM2 is a whole body image facing backward. Then, as shown in B1 and B2, the character images IM1 and IM2 showing a rotating character are displayed as a character-creation image based on an operation input by the player. More specifically, when the right side of the whole body image of the character is displayed as the character image IM1, the left side of the whole body image of the character is displayed as the character image IM2. When the left side of the whole body image of the character is displayed as the character image IM1, the right side of the whole body image of the character is displayed as the character image IM2. As shown in B1 and B2, the character can rotate clockwise and anti-clockwise.

The player can select a character to be subjected to character creation from among two male models with different figures and two female models with different figures. For example, FIG. 16 shows an example of character-creation image when a thin male character is selected, and FIG. 17 shows an example of character-creation image when a well-built male character is selected.

Figure 17:
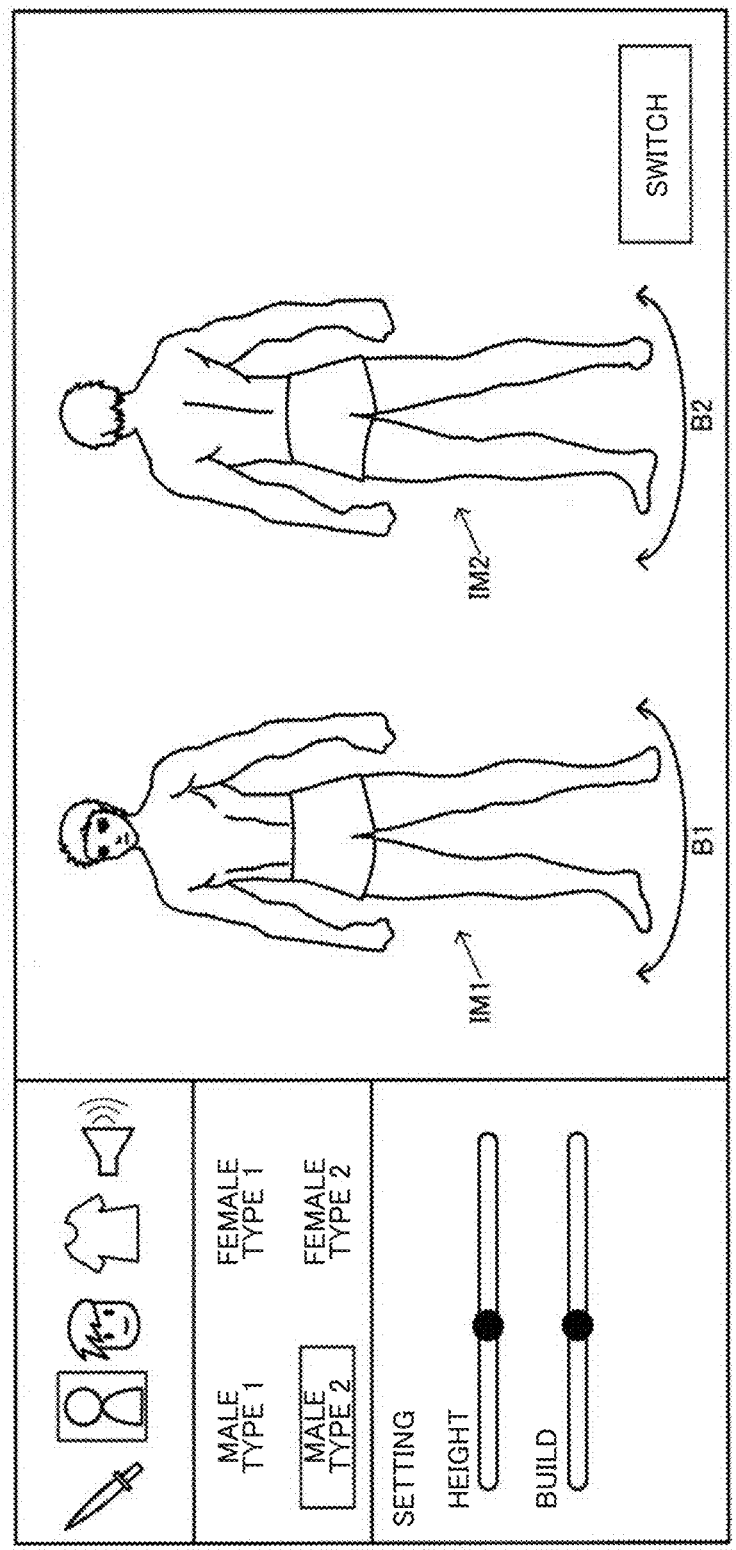
FIG. 17 is an example of a character-creation image showing an image of the whole body of a character.

Further, the examples in FIGS. 16 and 17 enable an operation of adjusting the height of the character or an operation of adjusting the degree of build of the character. For example, when the player performs an operation of adjusting the height of the character, the value of scaling in the X-axis direction for the bone data of FIG. 9 shown above is adjusted. With this operation, the length of each bone is adjusted, thereby increasing or lowering the height of the character. Further, when the player performs an operation of adjusting the degree of build of the character, the values of scaling in the Y-axis direction and the Z-axis direction in the bone data of FIG. 9 are adjusted. With this operation, the thickness of each bone is adjusted, thereby widening or narrowing the body part of the character, thus adjusting the degree of build (the thickness of the body part) of the character. In this way, the physique, the build, or the like of the character can be minutely adjusted, thereby enabling the player to perform more precise character creation.

Further, the present embodiment generates a plurality of character images in which the first portion is displayed in the first character image and the first portion is not displayed in the second character image. For example, the first portion of the character is rendered or not rendered depending on the relationship with the virtual camera direction.

Figure 18:
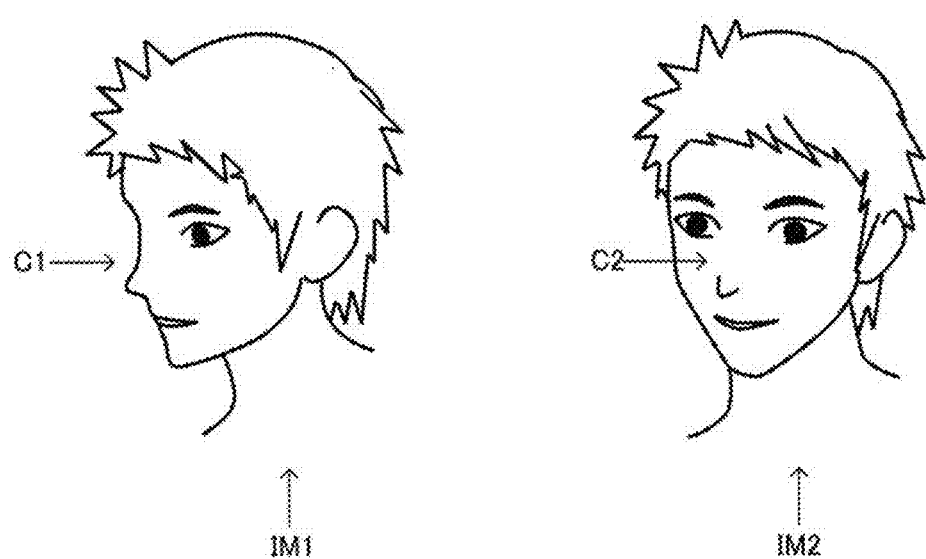
FIG. 18 is an explanatory view of a method of switching between display and non-display of predetermined parts of the character.

For example, in the character image IM1 of FIG. 18 showing the profile, the nose ridge part (an upper part of the nose outline) is rendered as indicated by C1. In contrast, in the character image IM2 showing the front face, the nose ridge part is not rendered as indicated by C2. The nose ridge part (first portion) of the character is thus displayed in the character image IM1 (first character image), but is not displayed in the character image IM2 (second character image). More specifically, the nose ridge part is rendered in the character image IM1 viewed from the virtual camera VC1, but is not rendered in the character image IM2 viewed from the virtual camera VC2.

For example, if a nose ridge part is clearly rendered in a character's front face image, the image may look unnatural as a character of an animation or the like. In contrast, as shown in C2 of FIG. 18, by hiding the nose ridge part in the character's front face image, it is possible to prevent generation of an unnatural character image, thereby displaying a more appropriate image as a character image for an animation or the like.

Further, in the present embodiment, the character image IM1, which is the first character image, is viewed from the virtual camera VC1, which is the first virtual camera direction, and the character image IM2, which is the second character image, is viewed from the virtual camera VC2, which is the second virtual camera direction. More specifically, the character images IM1 and IM2 are viewed from different virtual camera directions. Furthermore, in the present embodiment, the first part having the first portion and the second part without the first portion are prepared for a single part constituting the character. For example, in FIG. 18, the single part constituting the character is the nose part. In this case, multiple types of parts, such as a first part (first nose part) and a second part (second nose part), are prepared to be used for the nose part. The first part is a part having a nose ridge part (first portion), and the second part is a part without the nose ridge part. For example, the first part has rendering data of a nose ridge part (rendered as an outline); however, the second part does not have rendering data of a nose ridge part (not rendered as an outline). Further, in the present embodiment, the first character image is generated using the first part, and the second character image is generated using the second part. For example, in FIG. 18, the character image IM1, which is the first character image, is generated using the first part having a nose ridge part, and the character image IM2, which is the second character image, is generated using the second part without a nose ridge part. Accordingly, as shown in C1 of FIG. 18, the nose ridge part (first portion) is rendered and displayed in the character image IM1 viewed from the first virtual camera direction, which is the direction of the virtual camera VC1. In contrast, as shown in C2 of FIG. 18, the nose ridge part is not rendered and is not displayed in the character image IM2 viewed from the second virtual camera direction, which is the direction of the virtual camera VC2. In this way, it is possible to display or hide the nose ridge part, which is the first portion, according to the direction of the virtual camera.

The process of rendering the outline of a part, such as the outline of a nose, can be performed by, for example, the known Toon shading (Toon shader). For example, the outline of the character can be rendered by rendering both of the normal model and the outline rendering model, or by way of post-effect processing using the normal vector of the object.

Further, although the character image showing a front face is rendered by drawing small details of the parts, such small details may be omitted in the character profile image. For example, although a tongue part and a tooth part are rendered and displayed in the mouth in the character's front face image, they are not rendered and are not displayed in the character's profile image. For example, in the character image of a profile, rendering data of a tongue part and a tooth part are not used. Similarly, although small details of the nostril are rendered in the image of character's front face, they are not rendered in the character's profile image. In this manner, it is possible to perform an appropriate character image rendering process according to the relative directional relationship between the direction of the virtual camera and the direction of the character. If there is a large distance between the character and the virtual camera, the outline of a part, such as a nose part, may be difficult to see. In this case, the thickness of the outline may be changed according to the distance between the character and the virtual camera, thereby performing control so that the outline is appropriately displayed even when the character and the virtual camera are distant from each other.

As described above, in accordance with one of some embodiments, there is provided a game system comprising a processor including hardware, the processor being configured to perform: a reception process of receiving an operation input by a player; a virtual space setting process of setting a virtual space in which at least one character is disposed; a virtual camera setting process of setting a plurality of virtual cameras; a character process of setting parts constituting the at least one character based on the operation input by the player; and a display process of generating a plurality of character images, which are images of the at least one character viewed from the plurality of virtual cameras in the virtual space, and displaying a character-creation image in which the plurality of character images are arranged on a display section, in the display process, when the setting process of setting the parts is performed, the processor performing a process of displaying, on the display section, the character-creation image on which the result of the setting process is reflected.

In accordance with one of some embodiments, in a virtual space in which at least one character is disposed, a process of setting a plurality of virtual cameras is performed, and a process of setting parts constituting the at least one character is performed based on an operation input by a player. Then, a character-creation image in which a plurality of character images showing characters viewed from the plurality of virtual cameras are arranged is displayed. When the player performs an operation input to perform a parts setting process, the character-creation image in which the setting process is reflected is displayed. As a result, the player can check whether the character image after the parts setting process suits his/her preference or taste by looking at the plurality of character images of the character-creation image. This improves the operation efficiency of the player, thereby improving the interface environment of the player in character creation.

In accordance with one of some embodiments, the processor may arrange, as the at least one character, a plurality of characters in the virtual space in the virtual space setting process, set each virtual camera of the plurality of virtual cameras for each character of the plurality of characters in the virtual camera setting process, and generate an image of each character of the plurality of characters viewed from each virtual camera of the plurality of virtual cameras as each character image of the plurality of character images in the display process.

As a result, in some embodiments, the plurality of character images viewed from different virtual camera directions can be generated by a simple process, thereby improving the operation efficiency in character creation.

In accordance with one of some embodiments, in the virtual space setting process, the processor may set a light source for performing lighting of the plurality of characters in the virtual space, and in the display process, the processor performs a shading process with respect to the plurality of characters based on the light source, and generates the plurality of character images.

As a result, in some embodiments, it becomes possible to generate images of the characters shaded by the light source, thereby generating realistic character images. In addition, by performing lighting of a plurality of characters with a single light source, it is possible to suppress the occurrence of an event in which a dark character image is generated due to the directional relationship between the direction of the virtual camera and the direction of the character.

In accordance with one of some embodiments, in the character process, the processor may set directions of the plurality of characters relative to directions of the plurality of virtual cameras based on the operation input by the player.

As a result, in some embodiments, it becomes possible to change the facing directions of the characters in the character images according to the operation input by the player, thereby displaying the character images suitable for character creation to the player.

In accordance with one of some embodiments, in the character process, the processor may perform the process of setting the parts with respect to the plurality of characters based on the operation input by the player.

As a result, in some embodiments, a parts setting process is performed with respect to the plurality of characters based on an operation input by the player so that the results of the parts setting process are reflected on the plurality of character images. This enables the player to perform the operation of character creation while confirming the character images after the parts setting process, thereby enabling the player to perform character creation with high operation efficiency.

In accordance with one of some embodiments, in the display process, the processor may generate, as the plurality of character images, the first character image viewed from the first virtual camera direction and the second character image viewed from the second virtual camera direction, which is different from the first virtual camera direction.

As a result, in some embodiments, the plurality of character images including the first character image viewed from the first virtual camera direction and the second character image viewed from the second virtual camera direction may be displayed as the character-creation image to the player.

In accordance with one of some embodiments, in the display process, the processor may dispose a predetermined part so that the predetermined part in the first character image and the predetermined part in the second character image differ in position.

As a result, in some embodiments, if the character image looks somewhat strange when the predetermined part is disposed at the same position in the first character image and the second character image, it is possible to generate a character image looking more natural by changing the position of the predetermined part.

In accordance with one of some embodiments, in the display process, the processor may change motion data of one or more parts constituting a face of at least one character image of the plurality of character images so as to change expression of the face.

As a result, in some embodiments, it is possible to change the facial expression of the character in various ways by a light-load process, i.e., by changing motion data, thereby, for example, reducing or simplifying the character-creation process.

In accordance with one of some embodiments, in the display process, when the process of setting the parts is performed based on the operation input by the player, the processor may display the character-creation image in which the process of setting the parts is performed with respect to the plurality of character images on the display section.

As a result, in some embodiments, when the parts setting process is performed based on an operation input by the player, the results of the setting process are reflected in the plurality of character images, thereby displaying a character-creation image suitable for character creation to the player.

In accordance with one of some embodiments, in the display process, the processor collectively may change the plurality of character images into character images viewed from different virtual camera directions based on the operation input by the player.

As a result, in some embodiments, the player can collectively change the facing directions of the characters in the character images by performing a predetermined operation input, thereby improving the interface environment of the player in character creation.

In accordance with one of some embodiments, in the display process, the processor individually may change the plurality of character images into character images viewed from different virtual camera directions based on the operation input by the player.

As a result, in some embodiments, it is possible to individually change the facing direction of the character only for the target character image. This satisfies various requirements from the player in character creation.

In accordance with one of some embodiments, in the display process, the processor may generate the plurality of character images so that a predetermined part is displayed in all of the plurality of character images.

As a result, in some embodiments, the predetermined part is always displayed in the plurality of character images, thus enabling the player to appropriately perform parts setting for the predetermined parts.

In accordance with one of some embodiments, in the display process, the processor may generate the plurality of character images in which a first portion is displayed in a first character image and the first portion is not displayed in a second character image.

As a result, in some embodiments, if the second character image looks unnatural by having the first portion, which is displayed in the first character image, it is possible to hide the first portion in the second character image, thereby displaying appropriate first and second character images.

In accordance with one of some embodiments, the first character image may be a character image viewed from a first virtual camera direction, and the second character image may be a character image viewed from a second virtual camera direction, a first part having the first portion and a second part without the first portion are prepared for a part constituting a character, and in the display process, the processor may generate the first character image using the first part, and generates the second character image using the second part.

As a result, in some embodiments, upon the generation of the first character image viewed from the first virtual camera direction, the first part with the first portion is used, and upon the generation of the second character image viewed from the second virtual camera direction, the second part without the first portion is used. Therefore, by using the first part having the first portion, the first portion is displayed in the first character image; further, by using the second part that does not have the first portion, the first portion is not displayed in the second character image.

In accordance with one of some embodiments, there is provided a processing method comprising: a reception process of receiving an operation input by a player; a virtual space setting process of setting a virtual space in which at least one character is disposed; a virtual camera setting process of setting a plurality of virtual cameras; a character process of setting parts constituting the at least one character based on the operation input by the player; and a display process of generating a plurality of character images, which are images of the at least one character viewed from the plurality of virtual cameras in the virtual space, and displaying a character-creation image in which the plurality of character images are arranged on a display section, in the display process, when the process of setting the parts is performed, the processor performing a process of displaying, on the display section, the character-creation image on which the result of the setting process is reflected.

In accordance with one of some embodiments, there is provided a computer-readable information storage medium storing a program for causing a computer to perform the processing method as described above.

Although the present embodiments have been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, in the specification or the drawings, each of terms that is at least once used together with another broader-sense or synonymous term can be replaced with the other term at any part of the specification or the drawings. Further, the reception process, the virtual space setting process, the virtual camera setting process, the parts setting process, the character image generation process, the character-creation image generation process, and the like are also not limited to those described in the present embodiment, and methods equivalent thereto are also included in the scope of the present disclosure.

What is claimed is:

1. A game system comprising:
    a processor including hardware, the processor being configured to perform:
    a reception process of receiving an operation input by a player;
    a virtual space setting process of setting a virtual space in which at least one character being created by the player is disposed;
    a virtual camera setting process of setting a plurality of virtual cameras;
    a character process of setting parts constituting the at least one character being created by the player based on the operation input by the player; and
    a display process of generating a plurality of character images, which are images of the at least one character being created by the player, as viewed from the plurality of virtual cameras in the virtual space, and displaying a character-creation image in which the plurality of character images are simultaneously arranged on a display section,
    in the display process, when the setting process of setting the parts is performed, the processor performing a process of displaying, on the display section, the character-creation image on which the result of the setting process is reflected.
2. The game system as defined in claim 1, wherein,
    in the virtual space setting process, the processor arranges a plurality of separate characters corresponding to the at least one character being created by the player, in the virtual space,
    in the virtual camera setting process, the processor sets each of the plurality of virtual cameras for each of the plurality of separate characters, and
    in the display process, the processor generates an image of each of the plurality of separate characters viewed from a corresponding one of the plurality of virtual cameras as each character image of the plurality of character images.
3. The game system as defined in claim 2, wherein,
    in the virtual space setting process, the processor sets a light source for performing lighting of the plurality of separate characters in the virtual space, and
    in the display process, the processor performs a shading process with respect to the plurality of separate characters based on the light source, and generates the plurality of character images.
4. The game system as defined in claim 2, wherein,
    in the character process, the processor sets directions of the plurality of separate characters relative to directions of the plurality of virtual cameras based on the operation input by the player.
5. The game system as defined in claim 2, wherein,
    in the character process, the processor performs the process of setting the parts with respect to the plurality of separate characters based on the operation input by the player.
6. The game system as defined in claim 1, wherein,
    in the display process, the processor generates, as the plurality of character images, a first character image viewed from a first virtual camera direction and a second character image viewed from a second virtual camera direction, which is different from the first virtual camera direction.
7. The game system as defined in claim 6, wherein,
    in the display process, the processor disposes a predetermined part so that the predetermined part in the first character image and the predetermined part in the second character image differ in position.
8. The game system as defined in claim 1, wherein,
    in the display process, the processor changes motion data of one or more parts constituting a face of at least one character image of the plurality of character images so as to change expression of the face.
9. The game system as defined in claim 1, wherein,
    in the display process, when the process of setting the parts is performed based on the operation input by the player, the processor displays the character-creation image in which the process of setting the parts is performed with respect to the plurality of character images on the display section.
10. The game system as defined in claim 1, wherein,
    in the display process, the processor collectively changes the plurality of character images into character images viewed from different virtual camera directions based on the operation input by the player.
11. The game system as defined in claim 1, wherein,
    in the display process, the processor individually changes the plurality of character images into character images viewed from different virtual camera directions based on the operation input by the player.
12. The game system as defined in claim 1, wherein,
    in the display process, the processor generates the plurality of character images so that a predetermined part is displayed in all of the plurality of character images.
13. The game system as defined in claim 1, wherein,
    in the display process, the processor generates the plurality of character images in which a first portion is displayed in a first character image and the first portion is not displayed in a second character image.
14. The game system as defined in claim 13, wherein,
    the first character image is a character image viewed from a first virtual camera direction, and the second character image is a character image viewed from a second virtual camera direction, a first part having the first portion and a second part without the first portion are prepared for a part constituting a character, and in the display process, the processor generates the first character image using the first part, and generates the second character image using the second part.

15. A processing method comprising:

a reception process of receiving an operation input by a player;

a virtual space setting process of setting a virtual space in which at least one character being created by the player is disposed;

a virtual camera setting process of setting a plurality of virtual cameras;

a character process of setting parts constituting the at least one character being created by the player based on the operation input by the player; and a display process of generating a plurality of character images, which are images of the at least one character being created by the player, as viewed from the plurality of virtual cameras in the virtual space, and displaying a character-creation image in which the plurality of character images are simultaneously arranged on a display section, in the display process, when the process of setting the parts is performed, the processor performing a process of displaying, on the display section, the character-creation image on which the result of the setting process is reflected.

16. A non-transitory computer-readable information storage medium storing a program for causing a computer to perform the processing method as defined in claim 15.

* * * * *